United States Patent
Nakano et al.

(10) Patent No.: US 9,985,507 B2
(45) Date of Patent: May 29, 2018

(54) PERMANENT MAGNET TYPE MOTOR

(71) Applicant: Mitsubishi Electric Corporation, Tokyo (JP)

(72) Inventors: Masatsugu Nakano, Tokyo (JP); Yu Hirotani, Tokyo (JP); Satoru Akutsu, Tokyo (JP); Toyoaki Udo, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 14/758,298

(22) PCT Filed: Apr. 22, 2013

(86) PCT No.: PCT/JP2013/061786
§ 371 (c)(1),
(2) Date: Jun. 29, 2015

(87) PCT Pub. No.: WO2014/174572
PCT Pub. Date: Oct. 30, 2014

(65) Prior Publication Data
US 2015/0357892 A1  Dec. 10, 2015

(51) Int. Cl.
*H02K 1/27* (2006.01)
*H02K 29/03* (2006.01)
(Continued)

(52) U.S. Cl.
CPC .......... *H02K 29/03* (2013.01); *B62D 5/0424* (2013.01); *H02K 1/278* (2013.01); *H02K 1/2773* (2013.01);
(Continued)

(58) Field of Classification Search
CPC ............ H02K 1/14; H02K 1/16; H02K 1/165; H02K 1/22; H02K 1/2746; H02K 1/2766;
(Continued)

(56) References Cited

U.S. PATENT DOCUMENTS 5,990,591 A  11/1999 Yamaguchi et al.
7,397,159 B2 *  7/2008 Yoshinaga ............. H02K 21/14
                                                 310/112
(Continued)

FOREIGN PATENT DOCUMENTS

CN  102780288 A  11/2012
JP  10-243623 A   9/1998
(Continued)

OTHER PUBLICATIONS

International Search Report PCT/JP2013/061786 dated Jul. 9, 2013.
(Continued)

*Primary Examiner* — Tran Nguyen
(74) *Attorney, Agent, or Firm* — Sughrue Mion, PLLC; Richard C. Turner

(57) ABSTRACT

To provide a permanent magnet type motor having reduced torque ripple, in which torque ripples for electric angle sixth order and twelfth order are both reduced with a small skew angle.

Driving is performed such that phases of currents flowing in two sets of three-phase armature windings 26-1 and 26-2 are different from each other by 20 degrees to 40 degrees in electric angle. A rotor 11 is composed of m stages of rotor component units arranged in the axial direction. The m stages of rotor component units are skewed to have a stage-skew structure such that a skew angle θ (unit: degree) between the adjacent units satisfies $26/m \leq \theta \leq 43.2/m$ (m is an integer equal to or greater than 2) in electric angle.

12 Claims, 16 Drawing Sheets

(51) Int. Cl.
*H02K 3/12* (2006.01)
*H02K 3/28* (2006.01)
*B62D 5/04* (2006.01)
*H02P 25/22* (2006.01)
*H02P 6/10* (2006.01)
*H02K 21/14* (2006.01)
*H02K 11/33* (2016.01)

(52) U.S. Cl.
CPC .............. *H02K 3/12* (2013.01); *H02K 3/28* (2013.01); *H02P 6/10* (2013.01); *H02P 25/22* (2013.01); *H02K 11/33* (2016.01); *H02K 21/14* (2013.01); *H02K 2201/06* (2013.01); *H02K 2213/03* (2013.01)

(58) Field of Classification Search
CPC ........... H02K 1/278; H02K 3/12; H02K 3/18; H02K 3/28; H02K 21/14; H02K 21/16; H02K 21/22; H02K 29/03; H02P 6/10; B62D 5/04
See application file for complete search history.

(56) References Cited

U.S. PATENT DOCUMENTS

| | | | | |
|---|---|---|---|---|
| 8,487,497 B2* | 7/2013 | Taniguchi | ............ | H02K 1/2746 310/179 |
| 8,680,731 B2* | 3/2014 | Akutsu | .................. | H02K 21/16 310/156.46 |
| 9,184,648 B2* | 11/2015 | Taniguchi | ............ | H02K 21/16 |
| 9,564,779 B2* | 2/2017 | Nakano | .................. | H02K 21/16 |
| 2004/0164635 A1 | 8/2004 | Takahashi et al. | | |
| 2005/0179334 A1* | 8/2005 | Yoshinaga | ............. | H02K 21/14 310/156.47 |
| 2009/0224621 A1* | 9/2009 | Okubo | .................. | H02K 1/278 310/156.25 |
| 2010/0244611 A1* | 9/2010 | Akutsu | .................. | H02K 21/16 310/179 |
| 2012/0139380 A1* | 6/2012 | Taniguchi | ............ | H02K 1/2746 310/156.48 |
| 2012/0169163 A1 | 7/2012 | Imai et al. | | |
| 2012/0286612 A1* | 11/2012 | Taniguchi | .............. | H02K 21/16 310/156.01 |
| 2013/0038161 A1 | 2/2013 | Pan | | |
| 2014/0145547 A1* | 5/2014 | Nakano | .................. | H02K 21/16 310/216.069 |

FOREIGN PATENT DOCUMENTS

| | | |
|---|---|---|
| JP | 2003-224940 A | 8/2003 |
| JP | 2004-274963 A | 9/2004 |
| JP | 2009-213284 A | 9/2009 |
| JP | 2010-114994 A | 5/2010 |
| JP | 2010-226935 A | 10/2010 |
| JP | 2012-125006 A | 6/2012 |
| JP | 2012-157236 A | 8/2012 |
| JP | 2012-254001 A | 12/2012 |
| WO | 2013/54439 A1 | 4/2013 |

OTHER PUBLICATIONS

Communication dated Nov. 15, 2016, from the Japanese Patent Office in counterpart application No. 2015-513379.
Communication dated Dec. 1, 2016, from the European Patent Office in counterpart European application No. 13883189.6.
Communication dated Oct. 27, 2015 from the Japanese Patent Office issued in corresponding Japanese application No. 2015-513379.
Communication dated Mar. 3, 2017 from the State Intellectual Property Office of the P.R.C. in counterpart application No. 201380075889.3.
Communication dated Dec. 5, 2017, from the State Intellectual Property Office of People's Republic of China in counterpart Application No. 201380075889.3.
Communication dated Nov. 3, 2017, from the European Patent Office in counterpart European application No. 13883189.6.

* cited by examiner

SKEW ANGLE θ

SKEW ANGLE θ BETWEEN ROTOR COMPONENT UNITS

SKEW ANGLE θ BETWEEN ROTOR COMPONENT UNITS

SKEW ANGLE θ

SKEW ANGLE θ

(a)   (b)   (c)

ROTATION ANGLE (deg) IN ELECTRIC ANGLE

ROTATION ANGLE (deg) IN ELECTRIC ANGLE

ROTATION ANGLE (deg) IN ELECTRIC ANGLE (a)

(b)

PERMANENT MAGNET TYPE MOTOR

CROSS REFERENCE TO RELATED APPLICATIONS

This application is a National Stage of International Application No. PCT/JP2013/061786 filed Apr. 22, 2013, the contents of all of which are incorporated herein by reference in their entirety.

TECHNICAL FIELD

The present invention relates to a permanent magnet type motor, and particularly, to a motor used for an electric power steering device for vehicle.

BACKGROUND ART

Conventionally, structures of motors used for electric power steering devices have been devised, and a stage-skew structure is disclosed in Patent Documents 1 and 2, for example.

Patent Document 1 discloses that each divided rotor core is rotationally displaced from each other by 6 degrees in one direction around the central axis line of the rotational shaft such that magnetic skew by 60 degrees in electric angle is kept between a magnetic pole of a rotor core and a magnetic pole of a stator, thereby eliminating a torque ripple wave for electric angle twelfth order occurring in a brushless motor.

Patent Document 2 discloses that a brushless motor having a rotor with 2n-number of magnetic poles and a stator with 3n-number of slots has a step-skew structure in which the magnetic poles of the rotor are formed by segment magnets arranged at three stages in the axial direction, and the magnets at the adjacent stages are displaced from each other in the circumferential direction such that a skew angle θ skew of the segment magnets is set at 60 to 75 degrees in electric angle, thereby improving robustness, and improving output as compared to a conventional motor having a rotor-skew structure using a ring magnet.

CITATION LIST

Patent Document

Patent Document 1: Japanese Laid-Open Patent Publication No. 2012-157236
Patent Document 2: Japanese Laid-Open Patent Publication No. 2009-213284

SUMMARY OF THE INVENTION

Problems to be Solved by the Invention

However, in the structure in Patent Document 1, the skew angle is as great as 60 degrees in electric angle. In the case where the skew angle is 60 degrees, induced voltage becomes close to a sine wave and torque ripple reduces, but torque reduces and a large amount of permanent magnets is used, resulting in a problem of increasing the cost. In the structure in Patent Document 2, the skew angle is as great as 60 to 75 degrees, and further, since the motor has a 2n-number of magnetic poles and 3n-number of slots, a winding factor is small, and a large amount of permanent magnets is used, resulting in a problem of increasing the cost.

In addition, there is also a problem that such a motor having 2n-number of magnetic poles and 3n-number of slots causes great torque ripple.

The present invention has been made to solve the above problems, and an object of the present invention is to provide a permanent magnet type motor having reduced torque ripple, in which torque ripples for electric angle sixth order and twelfth order are both reduced with a small skew angle.

Solution to the Problems

A permanent magnet type motor of the present invention includes: a rotor including a rotor iron core, and permanent magnets placed in the rotor iron core and forming magnetic poles; and a stator including a stator iron core and armature windings stored in a plurality of slots formed in the stator iron core, the armature windings being composed of two sets of three-phase windings which are first and second armature windings. The first armature windings are supplied with current from a first inverter. The second armature windings are supplied with current from a second inverter. Of the two sets of three-phase windings, the first armature windings are composed of windings for U1 phase, V1 phase, and W1 phase, and the second armature windings are composed of windings for U2 phase, V2 phase, and W2 phase. The windings for U1 phase and U2 phase are stored in slots adjacent to each other. The windings for V1 phase and V2 phase are stored in slots adjacent to each other. The windings for W1 phase and W2 phase are stored in slots adjacent to each other. Driving is performed such that phases of currents flowing in the two sets of three-phase windings are different from each other by 20 degrees to 40 degrees in electric angle. The rotor is composed of m stages of rotor component units arranged in an axial direction. The m stages of rotor component units are skewed to have a stage-skew structure such that a skew angle θ (unit: degree) between the adjacent units satisfies 26/m≤θ≤43.2/m (m is an integer equal to or greater than 2) in electric angle.

Effect of the Invention

The present invention provides effects that torque ripple for electric angle sixth order and torque ripple for electric angle twelfth order can be both reduced, and further, since torque reduction due to skew is small, the amount of permanent magnets can be decreased, whereby a permanent magnet type motor with small size and high torque can be obtained.

DESCRIPTION OF EMBODIMENTS

Hereinafter, preferred embodiments of a permanent magnet type motor for electric power steering of the present invention will be described with reference to the drawings.

Embodiment 1

Figure 21:
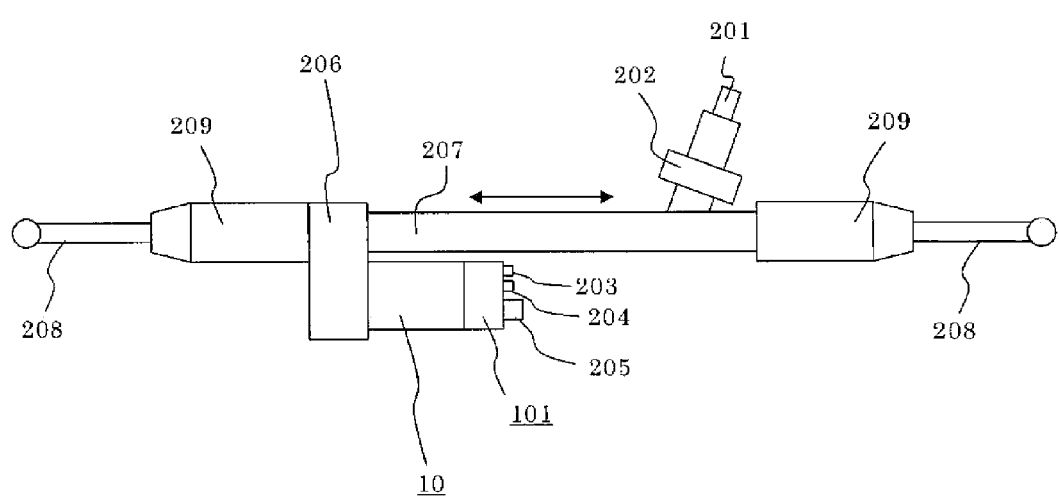
FIG. 21 is a schematic explanation diagram of an electric power steering device using the permanent magnet type motor of the present invention.

FIG. 21 is a schematic explanation diagram showing an electric power steering device for vehicle.

A driver steers a steering wheel (not shown), and the resultant torque is transferred to a shaft 201 via a steering shaft (not shown).

Torque detected by a torque sensor 202 at this time is converted to an electric signal, and the electric signal is transmitted to an ECU (Electronic Control Unit) 101 through a cable via a connector 203.

The ECU 101 includes an inverter circuit for driving a control board and a motor 10.

Meanwhile, information about an automobile, such as a vehicle velocity, is converted to an electric signal, and the electric signal is transmitted to the ECU 101 via a connector 204.

The ECU 101 calculates required assist torque from the information about the automobile, such as the torque and the vehicle velocity, and supplies current to the permanent magnet type motor 10 through an inverter.

The motor 10 is placed in parallel with a movement direction (indicated by an arrow) of a rack shaft.

Power to the ECU 101 is supplied via a power supply connector 205 from a battery or an alternator.

The torque generated by the permanent magnet type motor 10 is decelerated by a gearbox 206 containing a belt and a ball screw, and then causes a thrust force which moves the rack shaft present inside a housing 207 in the arrow direction, to assist a steering force for a driver.

Thus, a tie rod 208 moves and wheels are turned, whereby a vehicle is turned. Owing to assist by torque of the permanent magnet type motor 10, a driver can turn a vehicle with a small steering force.

A rack boot 209 is provided for preventing a foreign material from entering the device.

The motor 10 and the ECU 101 are unified to form an electric driving device.

Figure 1:
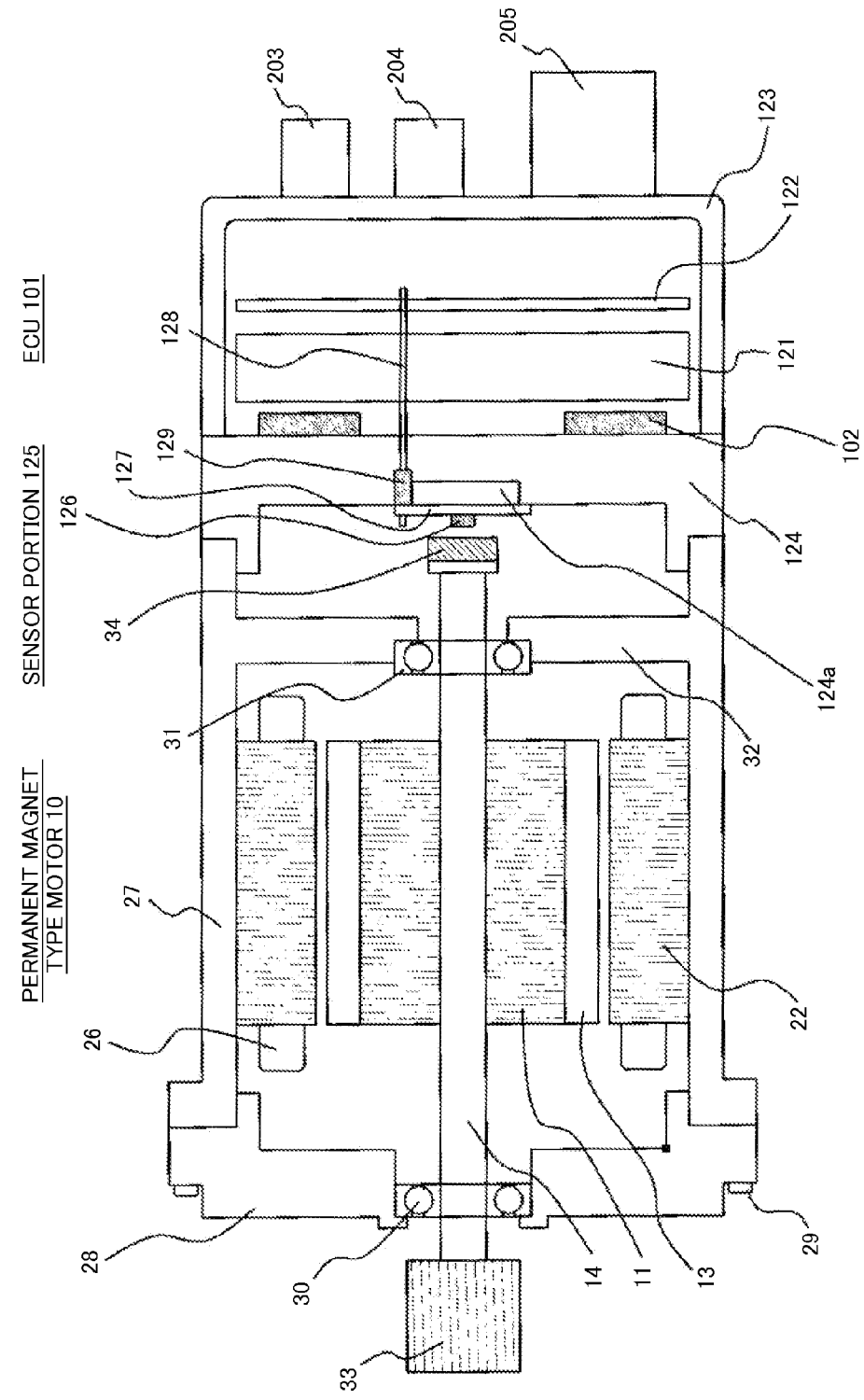
FIG. 1 is a sectional view showing the configuration of an electric driving device including a permanent magnet type motor of the present invention.

FIG. 1 is a sectional view showing the configuration of the electric driving device including the permanent magnet type motor of the present invention.

The electric driving device is formed by the permanent magnet type motor 10 of the present invention and the ECU 101 that are unified.

First, the permanent magnet type motor 10 will be described.

The permanent magnet type motor 10 includes a stator iron core 22 formed by stacked electromagnetic steel sheets, armature windings 26 stored in the stator iron core 22, and a frame 27 fixing the stator iron core.

Further, the frame 27 is fixed by a housing 28 and a bolt 29 provided on a front surface side of the motor 10.

The housing 28 is provided with a bearing 30. The bearing 30 together with a bearing 31 rotatably supports a shaft 14.

The bearing 31 is supported by a wall portion 32 provided integrally with or independently of the frame 27.

A pulley 33 is press-fitted to one end of the shaft 14, i.e., an output shaft side. The pulley 33 serves a role to transfer a drive force to the belt of the electric power steering device.

A sensor permanent magnet 34 is provided at the other end of the shaft 14.

A rotor iron core 12 is press-fitted to the shaft 14, and a permanent magnet 13 is fixed to the rotor iron core 12.

Although FIG. 1 shows an example in which the permanent magnet 13 is fixed on a surface of the rotor iron core 12, the permanent magnet 13 may be embedded in the rotor iron core 12. The details thereof will be described later.

Next, the ECU 101 will be described.

The ECU 101 is provided with the connector 203 for receiving a signal from a torque sensor 202, the connector 204 for receiving information about an automobile such as a vehicle velocity, and the power supply connector 205 for supplying power.

Further, as described later, the ECU 101 has an inverter 102 for driving the motor 10, and the inverter 102 has a switching element such as MOS-FET.

As the switching element, a DBC (Direct Bonded Copper) board having a bare chip mounted thereon, or a module having a bare chip molded with resin, may be used, for example.

The switching element generates heat because current for driving the motor flows therein.

Therefore, the switching element is in contact with a heat sink 124 via an adhesive agent, an insulating sheet, or the like, thereby dissipating the heat.

The inverter 102 has, besides the switching element, a smoothing capacitor, a noise removing coil, a power supply relay, a bus bar electrically connecting them, and the like, which are not shown in FIG. 1.

The bus bar is formed integrally with resin, to form an intermediate member 121.

A control board 122 is placed adjacent to the intermediate member 121.

The control board 122 transmits a control signal to the inverter 102, for appropriately driving the motor 10, based on information received from the connectors 203 and 204.

The control signal is transmitted via a connection member electrically connecting the control board 122 and the inverter 102.

The connection member is fixed by means of wire bonding, press-fit, soldering, or the like.

The inverter 102 and the control board 122 are covered by a case 123.

The case 123 may be made of resin or metal such as aluminum, or may be formed by a combination of resin and metal such as aluminum.

The control board 122 is placed along a plane perpendicular to the shaft 14 of the motor 10.

A sensor portion 125 is placed on a motor 10 side of the heat sink 124.

The sensor portion 125 has a magnetic sensor 126, a board 127, a connection member 128, and a support portion 129. The board 127, on which the magnetic sensor 126 is mounted, is fixed to the heat sink 124 by a screw (not shown).

The magnetic sensor 126 is placed coaxially with and being opposed to the shaft 14. The magnetic sensor 126 detects a magnetic field generated by the sensor permanent magnet 34 and obtains the direction thereof, thereby detecting a rotation angle of a rotor 11 of the motor 10.

The ECU 101 supplies the motor 10 with appropriate drive current in accordance with the rotation angle.

Further, the connection member 128 is supported by the support portion 129, and electrically connects the board 127 of the sensor portion 125 and the control board 122. This connection may be made by means of press-fit or soldering.

In order for the connection member 128 to penetrate the heat sink 124 and the intermediate member 121, holes (not shown) through which the connection member 128 penetrates are formed in the heat sink 124 and the intermediate member 121.

Further, although not shown, the intermediate member 121 has a guide for positioning the connection member 128.

Although FIG. 1 shows an example in which the magnetic sensor 126 is mounted on another board separate from the control board 122, the magnetic sensor 126 may be mounted on the control board 122 and may detect a magnetic flux leaked via the heat sink 124 from the sensor permanent magnet 34.

The positional relationship between the intermediate member 121 and the control board 122 may be reversed from that in FIG. 1.

Although FIG. 1 shows the case of applying the magnetic sensor 126 as a rotation sensor, needless to say, a resolver may be applied.

In FIG. 1, the heat sink 124 has a dent 124a to increase a distance between the magnetic sensor 126 mounted on the board 127 of the sensor portion 125 and a surface of the heat sink 124.

The heat sink 124 is fixed to the frame 27 of the motor 10 by means of screw or shrink fitting.

Thus, since the heat sink 124 is fixed to the frame 27 of the motor 10, heat of the heat sink 124 can be transferred to the frame 27 of the motor 10.

Figure 2:
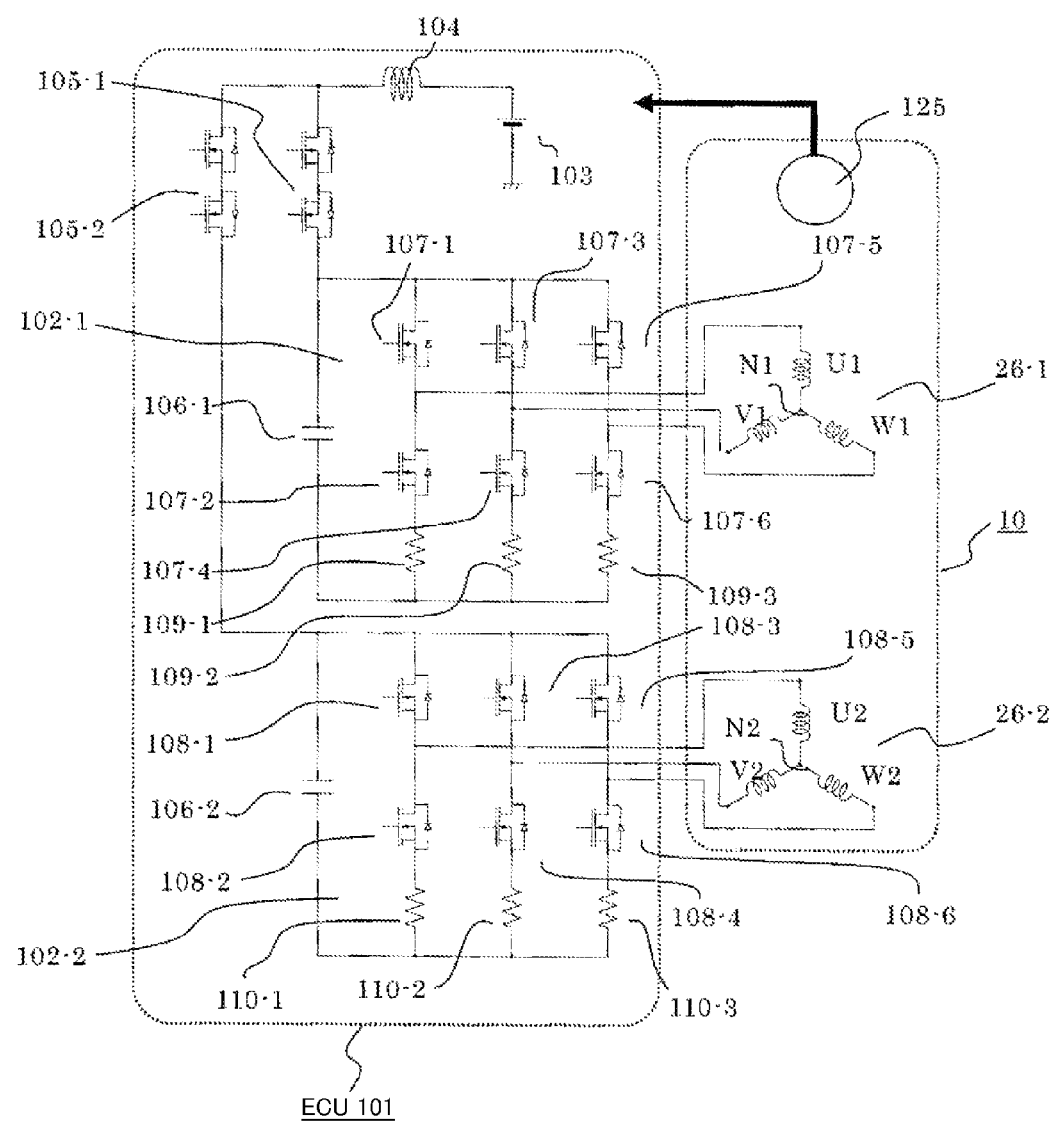
FIG. 2 is a circuit configuration diagram including a motor and an ECU according to embodiment 1 of the present invention.

FIG. 2 is a circuit configuration diagram including the motor 10 and the ECU 101 according to embodiment 1 of the present invention.

In FIG. 2, for the purpose of simplification, the details of the motor 10 are not shown but only the armature windings 26 are shown.

The armature windings 26 of the motor 10 are composed of two sets of armature windings. First armature windings 26-1 are composed of a first U-phase winding U1, a first V-phase winding V1, and a first W-phase winding W1. Second armature windings 26-2 are composed of a second U-phase winding U2, a second V-phase winding V2, and a second W-phase winding W2. Although the armature windings 26 are formed in Y connection in FIG. 2, the armature windings 26 may be formed in delta connection.

For the purpose of simplification, the details of the ECU 101 are also not shown but only a power circuit part of the inverter 102 is shown.

The ECU 101 includes two inverters 102-1 and 102-2. From the respective inverters 102-1 and 102-2, three-phase currents are supplied to the first and second armature windings 26-1 and 26-2.

The ECU 101 is supplied with DC power from a power supply 103 such as a battery, and a power supply relay 105 is connected via a noise removing coil 104.

In FIG. 2, the power supply 103 appears to be present inside the ECU 101, but actually, power is supplied via a connector from an external power supply such as a battery.

The power supply relay 105 includes two power supply relays 105-1 and 105-2 each of which is composed of two MOS-FETs. In the case of failure, the power supply relay 105 is opened to prevent excessive current from flowing.

Figure 3:
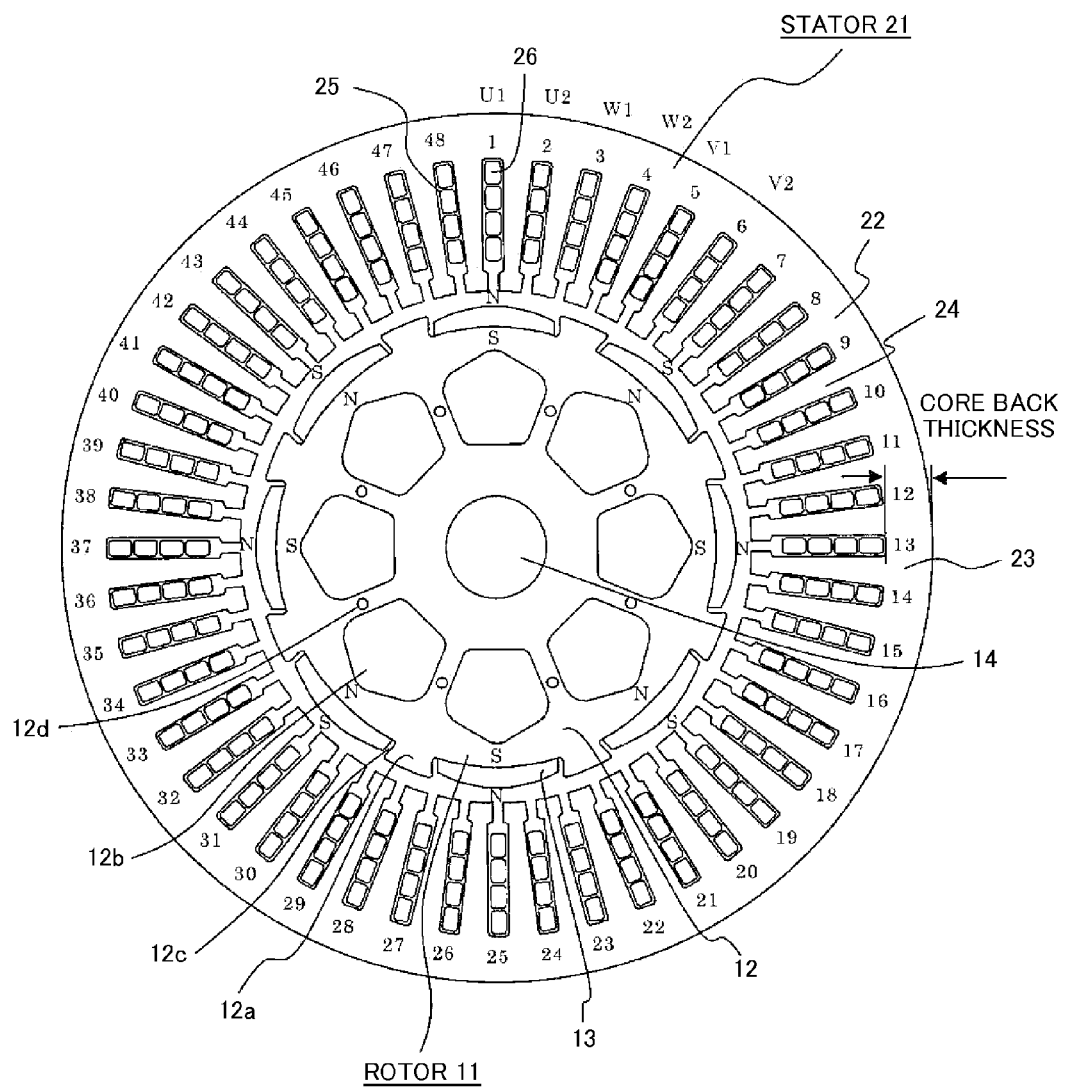
FIG. 3 is a sectional view showing the permanent magnet type motor according to embodiment 1 of the present invention.

In FIG. 3, the order of connection to the power supply relay 105 is the power supply 103, the coil 104, then the power supply relay 105. However, needless to say, the power supply relay 105 may be located nearer the power supply 103 than the coil 104 is.

A capacitor 106-1 and a capacitor 106-2 are smoothing capacitors. In FIG. 2, each capacitor is a single capacitor. However, needless to say, each capacitor may be composed of a plurality of capacitors connected in parallel.

The inverter 102- and the inverter 102-2 each have a bridge configuration using six MOS-FETs. In the inverter 102-1, a MOS-FET 107-1 and a MOS-FET 107-2 are connected in series, a MOS-FET 107-3 and a MOS-FET 107-4 are connected in series, and a MOS-FET 107-5 and a MOS-FET 107-6 are connected in series. These three pairs of MOS-FETs are connected in parallel.

Further, on the GND (ground) side of each of the three lower MOS-FETs 107-2, 107-4, and 107-6, one shunt resistor is connected, that is, a shunt 109-1, a shunt 109-2, and a shunt 109-3 are connected, respectively. These shunt resistors are used for detection of current values.

Here, the number of shunts is three as an example. However, even if the number of shunts is two or one, current detection can be performed. Therefore, needless to say, such a configuration may be employed.

Regarding supply of current to the motor 10, as shown in FIG. 2, current is supplied from between the MOS-FETs 107-1 and 107-2 through a bus bar or the like to U1 phase of the motor 10, current is supplied from between the MOS-FETs 107-3 and 107-4 through a bus bar or the like to V1 phase of the motor 10, and current is supplied from between the MOS-FETs 107-5 and 107-6 through a bus bar or the like to W1 phase of the motor 10.

The inverter 102-2 also has the same configuration. In the inverter 102-2, a MOS-FET 108-1 and a MOS-FET 108-2 are connected in series, a MOS-FET 108-3 and a MOS-FET 108-4 are connected in series, and a MOS-FET 108-5 and a MOS-FET 108-6 are connected in series. These three pairs of MOS-FETs are connected in parallel.

Further, on the GND (ground) side of each of the three lower MOS-FETs 108-2, 108-4, and 108-6, one shunt resistor is connected, that is, a shunt 110-1, a shunt 110-2, and a shunt 110-3 are connected, respectively. These shunt resistors are used for detection of current values.

Here, the number of shunts is three as an example. However, even if the number of shunts is two or one, current detection can be performed. Therefore, needless to say, such a configuration may be employed.

Regarding supply of current to the motor 10, as shown in FIG. 2, current is supplied from between the MOS-FETs 108-1 and 108-2 through a bus bar or the like to U2 phase of the motor 10, current is supplied from between the MOS-FETs 108-3 and 108-4 through a bus bar or the like to V2 phase of the motor 10, and current is supplied from between the MOS-FETs 108-5 and 108-6 through a bus bar or the like to W2 phase of the motor 10.

In FIG. 2, a motor relay for electrically disconnecting the motor 10 and the inverter 102 in the case of failure is not shown. Such a motor relay may be provided at neutral points N1 and N2 or between the motor and the inverter.

The two inverters 102-1 and 102-2 perform switching operations by a control circuit (not shown) sending signals to the MOS-FETs in accordance with a rotation angle detected by the sensor portion 125 of the motor 10, and supply desired three-phase currents to the first and second armature windings 26-1 and 26-2.

As a rotation angle sensor 111, a resolver, a GMR sensor, an MR sensor, or the like may be used.

FIG. 3 is a sectional view showing the permanent magnet type motor according to embodiment 1 of the present invention.

A stator 21 is placed so as to surround the outer circumference of the rotor 11. The stator 21 includes the armature windings 26 and the stator iron core 22.

The stator iron core 22 is composed of an annular core back 23 made of a magnetic material such as an electromagnetic steel sheet and teeth 24 extending radially inward from the core back 23.

The armature windings 26 are stored in slots 25 between the adjacent teeth 24.

Although not shown, an insulating sheet or the like is interposed between the armature windings 26 and the stator iron core 22, thereby ensuring electric insulation.

Forty-eight teeth 24 are formed in total, and therefore the number of slots 25 is also forty-eight in total. In each single slot 25, four coils of the armature windings 26 are stored.

The armature windings 26 are composed of two sets of armature windings. The first armature windings 26-1 are composed of the first U-phase winding U1, the first V-phase winding V1, and the first W-phase winding W1. The second armature windings 26-2 are composed of the second U-phase winding U2, the second V-phase winding V2, and the second W-phase winding W2.

As shown in FIG. 3, starting from the first slot 25, windings are arranged in order of U1, U2, W1, W2, V1, and then V2. Also from the seventh slot, windings are arranged in order of U1, U2, W1, W2, V1, and then V2, and thus windings are arranged in the same order to the forty-eighth slot.

However, the armature windings 26 are set such that the direction of current in U1 of the first slot 25 and the direction of current in U1 of the seventh slot 25 are opposite to each other.

That is, distributed winding from the first slot 25 to the seventh slot 25 is formed. Therefore, the armature windings 26 are formed over six teeth 24 in total.

This corresponds to 180 degrees in electric angle, and the short-pitch factor is 1. Therefore, a magnetic flux generated by permanent magnets can be effectively used, a motor with small size and high torque is obtained, and the amount of permanent magnets can be reduced. Therefore, an effect of reducing the cost as compared to a motor with a small winding factor is obtained.

Inside the stator 21, the rotor 11 is placed which has permanent magnets 13 on a surface of the rotor iron core 12.

There are eight permanent magnets 13 arranged in the circumferential direction, and eight poles are formed. The polarities of the adjacent permanent magnets 13 are opposite to each other.

The rotor iron core 12 has protrusions 12a. Gaps 12c for reducing leaked magnetic flux are formed between the protrusions 12a and the permanent magnets 13.

The protrusions 12a provide an effect of reducing an air gap in the motor, and as a result, inductance increases.

Therefore, flux weakening control can be performed more effectively, and an effect of improving torque at high-speed rotation is obtained.

The rotor iron core 12 has holes 12b. Owing to the holes 12b, weight and inertia are reduced.

The rotor iron core 12 is formed by stacking electromagnetic steel sheets or the like, and the electromagnetic steel sheets are joined with each other via swage portions 12d.

The shaft 14 penetrates through the center of the rotor iron core 12.

Figure 4:
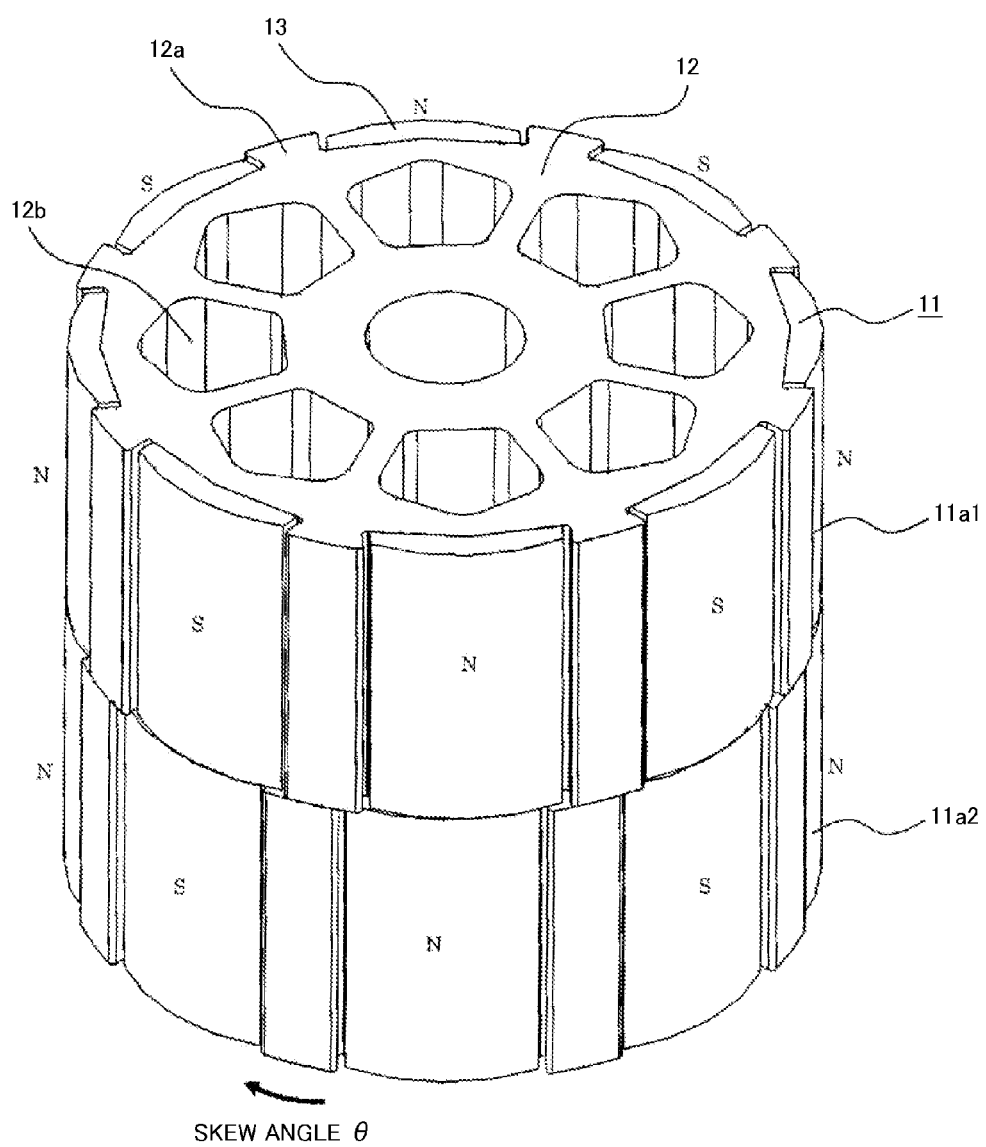
FIG. 4 is a perspective view showing a rotor of the permanent magnet type motor according to embodiment 1.

FIG. 4 is a perspective view showing the rotor of the permanent magnet type motor according to embodiment 1.

The rotor 11 is composed of two rotor component units 11a1 and 11a2 arranged in the axial direction.

The rotor component unit 11a1 includes the rotor iron core 12 having protrusions, and the permanent magnets 13. There are eight permanent magnets 13 arranged along the circumferential direction.

The rotor iron core 12 has the holes 12b. The rotor iron core 12 is formed by stacking sheet materials such as electromagnetic steel sheets. The sheet materials are joined via the swage portions 12d, which are not shown in FIG. 4.

The rotor component unit 11a2 has the same design as the rotor component unit 11a1, and also has the same axial length.

The rotor component unit 11a1 and the rotor component unit 11a2 are displaced from each other in a rotation angle direction. This angle is defined as a skew angle θ.

Next, the reason why torque ripple can be reduced in the permanent magnet type motor 10 of the present embodiment 1 will be described.

First, torque ripple for electric angle sixth order will be described.

As shown in FIG. 3, since the number of the slots 25 is forty-eight and the number of poles is eight, a slot pitch of the stator iron core of the permanent magnet type motor 10 is 360 degrees/48×4=30 degrees in electric angle.

Since the armature winding 26-1 and the armature winding 26-2 are stored in the adjacent slots 25, there is a phase difference by 30 degrees in electric angle between U1 and U2. Also, there is a phase difference by 30 degrees in electric angle between V1 and V2 and between W1 and W2.

Therefore, when three-phase AC currents are applied to the armature winding 26-1 and the armature winding 26-2 so as to have a phase difference by 30 degrees therebetween, the phase of torque ripple for electric angle sixth order caused due to a magnetomotive force of the armature winding 26-1 and the phase of torque ripple for electric angle sixth order caused due to a magnetomotive force of the armature winding 26-2 are inverted from each other, whereby the torque ripples for electric angle sixth order are cancelled.

Such application of currents having different phases between the armature winding 26-1 and the armature winding 26-2 can be realized by a circuit that individually controls each of the two inverters 102-1 and 102-2 as shown in FIG. 2.

It is noted that the same effect can be obtained if the phase difference between current in the armature winding 26-1 and current in the armature winding 26-2 is approximately 25 degrees to 35 degrees.

In the above, an effect of cancelling torque ripples for electric angle sixth order has been described, but there is also another effect. An effect of reducing torque ripples for odd-number multiple of sixth order, such as eighteenth order or thirtieth order, is also obtained owing to the phase difference between current in the armature winding 26-1 and current in the armature winding 26-2. That is, an effect of reducing torque ripples for $\{6(2n+1)\}$-th order (n is a positive integer) is also obtained.

Next, torque ripple for electric angle twelfth order will be described.

The torque ripple for electric angle twelfth order cannot be reduced merely by providing a phase difference between current in the armature winding 26-1 and current in the armature winding 26-2. Therefore, the torque ripple for electric angle twelfth order is reduced by motor structure.

The torque ripple for electric angle twelfth order is torque ripple with a cycle of 30 degrees in electric angle. Therefore, if two torque ripples for electric angle twelfth order having phases different from each other by 15 degrees in electric angle are added, they are cancelled.

Accordingly, as shown in FIG. 4, the rotor 11 is divided into two stages of the rotor component unit 11a1 and the rotor component unit 11a2, and they are placed with an angle θ (electric angle) set therebetween, to confirm that, if torque T1 of the rotor component unit 11a1 and torque T2 of the rotor component unit 11a2 are added, the torque ripples are cancelled.

Figure 12:
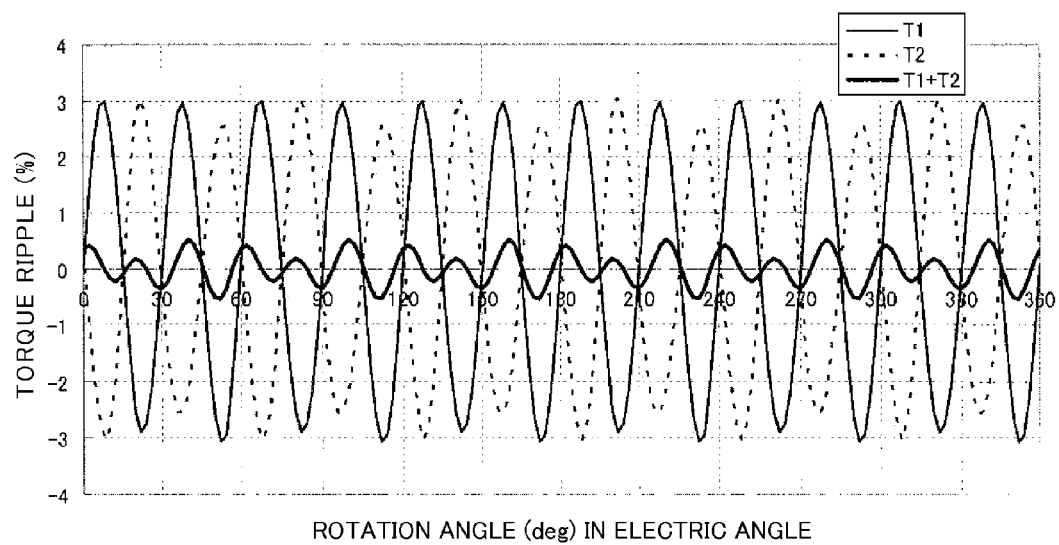
FIG. 12 is a waveform diagram of torque ripple for explaining torque ripple reduction in the permanent magnet type motor according to embodiment 1.

FIG. 12 shows waveforms of torque ripples in the case of θ=15 degrees (electric angle).

It is found that, in the waveform obtained by adding T1 and T2, i.e., T1+T2, torque ripple for electric angle twelfth order is greatly reduced.

A principle thereof will be understood as follows.

Figure 11:
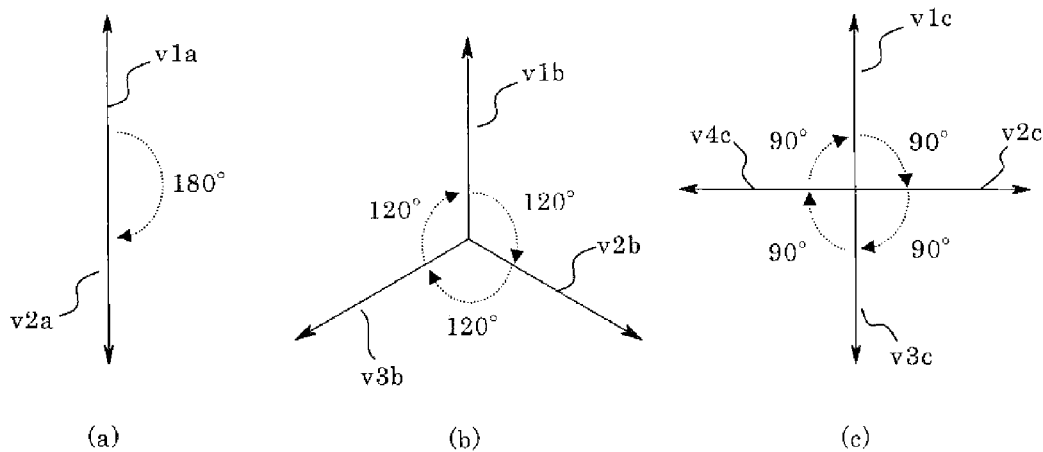
FIG. 11 is a vector diagram for explaining torque ripple reduction in the permanent magnet type motor according to embodiment 1.

FIG. 11(a) is a diagram showing two vectors with a phase difference by 180 degrees.

A vector v1a and a vector v2a have the same magnitude and have phases different from each other by 180 degrees.

If these vectors are added, a zero vector is obtained.

The same theory as for the vectors applies to the torque ripple for electric angle twelfth order. That is, a phase difference between two twelfth-order components should be set at 360/2=180 degrees. Therefore, θ is to be set at a value obtained by dividing 180 by the order number 12, i.e., 180/12=15 degrees (electric angle).

Figure 18:
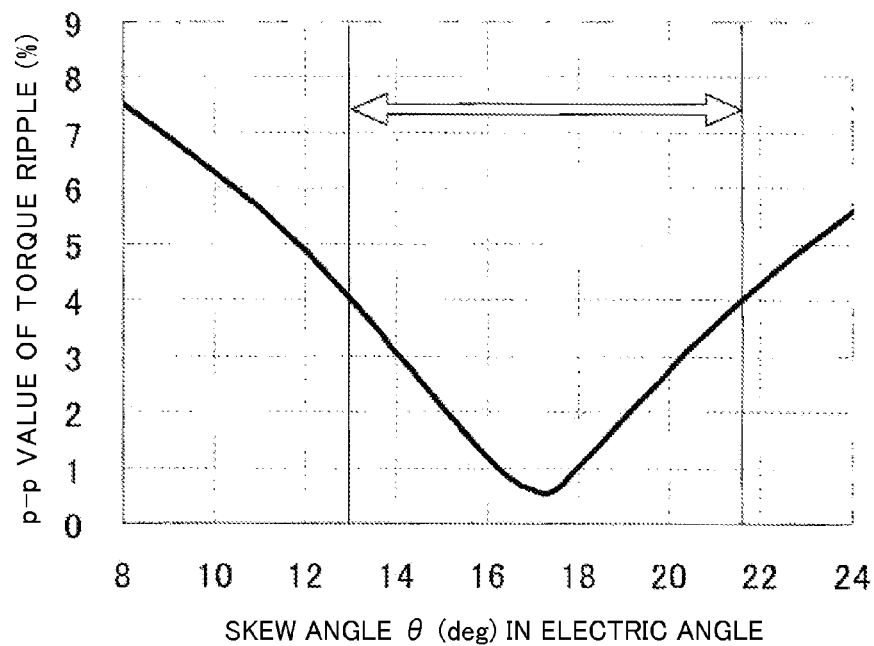
FIG. 18 is a characteristic diagram showing a relationship between a skew angle and torque ripple in the permanent magnet type motor according to embodiment 1.

FIG. 18 is a graph with a horizontal axis indicating a skew angle θ and a vertical axis indicating a p-p value of torque ripple which is represented by a percentage to average torque.

In an EPS (electric power steering system), it is required to reduce torque ripple of a motor in order to obtain preferable steering feeling and because of requirement to reduce vibration and noise.

From FIG. 18, it is found that the skew angle θ should be set at approximately 15 degrees (electric angle) in order to reduce torque ripple as described above.

In order to reduce a p-p value of torque ripple to 4% or lower, the skew angle θ may be set in a range from 13 degrees to 21.6 degrees (electric angle). In order to reduce a p-p value of torque ripple to 1% or lower, the skew angle θ may be set in a range from 16.2 degrees to 18 degrees (electric angle).

Possible factors that do not allow minimization at θ=15 degrees (electric angle) are an influence of magnetic saturation of a stator core or a rotor core, and the like.

Considering that the number of the rotor component units is two, 13 degrees to 21.6 degrees (electric angle) of the skew angle θ can be written as follows.

$$26/2 \leq \theta \leq 43.2/2$$

Figure 19:
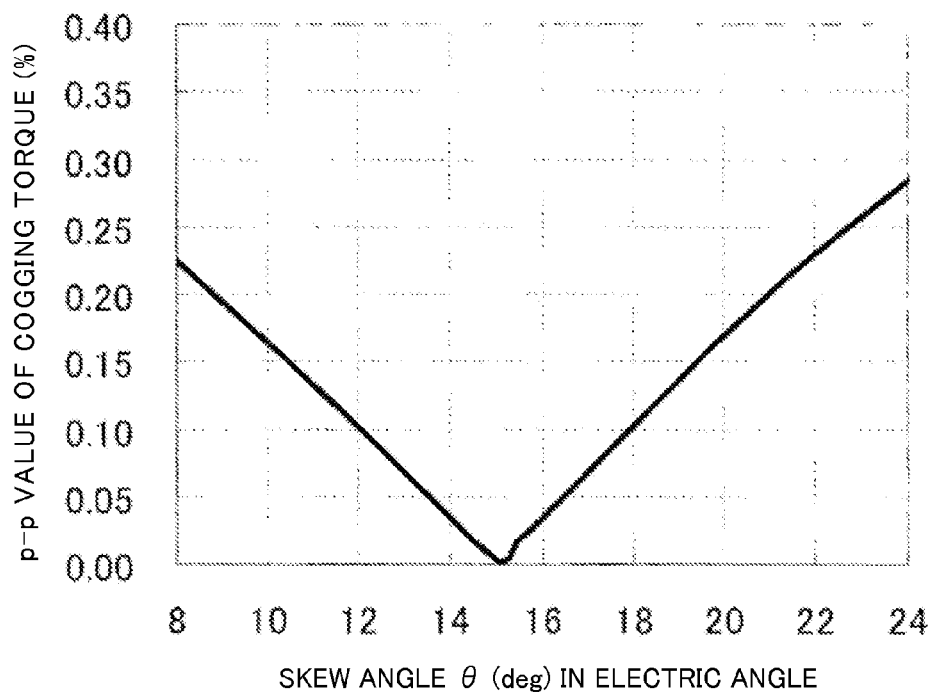
FIG. 19 is a characteristic diagram showing a relationship between a skew angle and cogging torque in the permanent magnet type motor according to embodiment 1.

FIG. 19 is a graph with a horizontal axis indicating a skew angle θ and a vertical axis indicating a p-p value of cogging torque which is represented by a percentage to average torque.

It is found that, if the skew angle is set at a value that can reduce torque ripple to 4% or lower, i.e., 13 degrees to 21.6 degrees (electric angle), the p-p value of cogging torque can be reduced to 0.22% or lower.

That is, torque ripple reduction and cogging torque reduction can be both realized.

Figure 15:
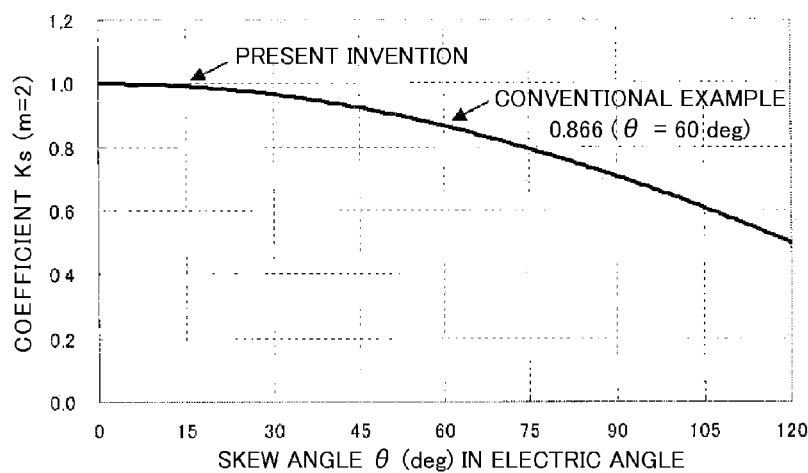
FIG. 15 is a characteristic diagram showing an example of a relationship between a skew angle and a coefficient in the permanent magnet type motor according to embodiment 1.

FIG. 15 shows a coefficient Ks which indicates a degree to which torque in the case of providing two-stage skew is reduced as compared to the case of providing no skew.

In FIG. 15, m=2 on the vertical axis means that the number of the rotor component units is two, that is, two-stage skew is provided.

In the case of m=2, Ks is represented as follows.

$$Ks = \cos(q/2) \qquad (1)$$

In a conventional example, the skew angle is 60 degrees in electric angle, and therefore Ks is 0.866 as indicated by an arrow in the graph. On the other hand, in the case where θ is set at 16.2 degrees to 18 degrees (electric angle), from expression (1), Ks becomes 0.990 to 0.988.

Thus, it is found from FIG. 15 and expression (1) that torque is greatly improved.

In the case where the number of the rotor component units is two, i.e., m=2, the number of components is less than in the case where m is 3 or greater, and therefore, an effect of reducing the cost is obtained.

Figure 13:
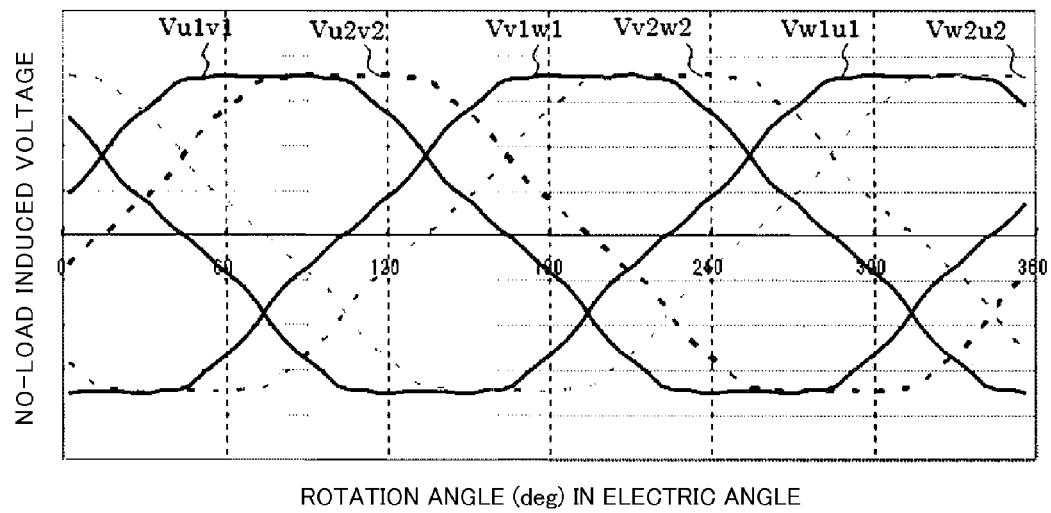
FIG. 13 is a waveform diagram showing no-load induced voltage having a trapezoidal shape in the permanent magnet type motor according to embodiment 1.

FIG. 13 is a waveform diagram showing no-load induced voltage having a trapezoidal shape, generated in the armature windings of the permanent magnet type motor according to embodiment 1.

The horizontal axis indicates a rotation angle in electric angle, and the vertical axis indicates no-load induced voltage which is represented as line-to-line voltage of the motor.

In FIG. 13, Vu1v1, Vu2v2, Vv1w1, Vv2w2, Vw1u1, and Vw2u2 indicate no-load induced voltages between phases of U1-V1, U2-V2, V1-W1, V2-W2, W1-U1, and W2-U2, respectively.

The phases of U1, V1, and W1 are different from each other by 120 degrees in electric angle, and the phases of U2, V2, and W2 are also different from each other by 120 degrees in electric angle.

In addition, the phases of U1 and U2 are different from each other by 30 degrees in electric angle. Also, the phases of V1 and V2 are different from each other by 30 degrees in electric angle, and the phases of W1 and W2 are different from each other by 30 degrees in electric angle.

Figure 14:
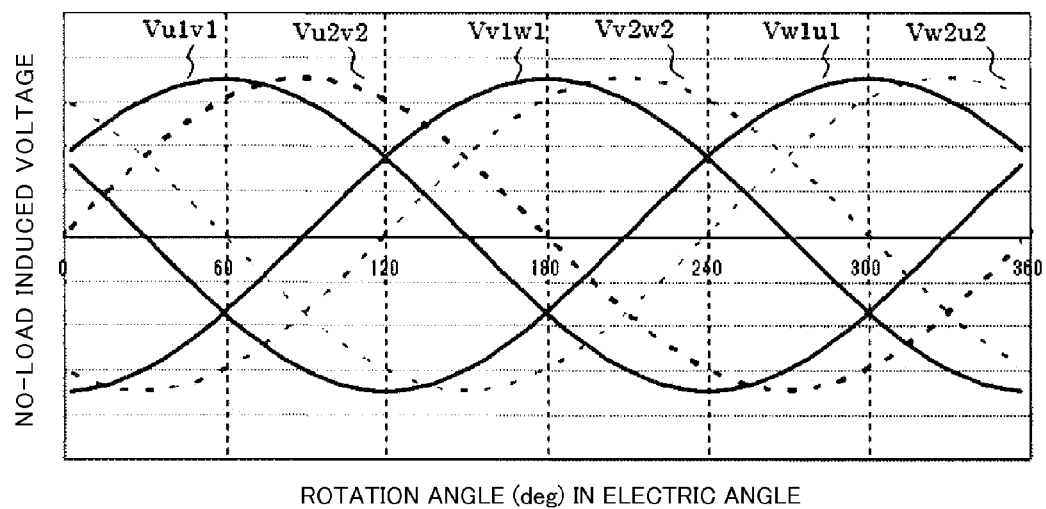
FIG. 14 is a waveform diagram showing no-load induced voltage having a sine waveform in a permanent magnet type motor.

Thus, if the no-load induced voltage has a trapezoidal waveform, the peak value of voltage can be reduced as compared to a sine wave (FIG. 14) of the same fundamental wave.

This means that voltage saturation hardly occurs, and therefore the rotation rate of the motor can be increased, whereby an effect of increasing output of the motor is obtained.

In order to reduce the body size of the motor, it is necessary to enlarge a pole arc angle of a permanent magnet and enlarge a fundamental wave of induced voltage. In addition, it is also necessary to reduce the skew angle as much as possible.

In the case where a pole arc angle of a permanent magnet is large or the skew angle is small, the no-load induced voltage tends to have a trapezoidal waveform.

In the case of sine-wave-driving a motor whose no-load induced voltage has a trapezoidal waveform, in a conventional three-phase motor structure, torque ripple greatly increases, thereby causing a problem of increasing vibration and noise. However, the present embodiment 1 has the following configuration.

Two sets of three-phase armature windings are provided.

First armature windings are supplied with current from a first inverter.

Second armature windings are supplied with current from a second inverter.

Of the two sets of three-phase armature windings, the first armature windings are composed of windings for U1 phase, V1 phase, and W1 phase, and the second armature windings are composed of windings for U2 phase, V2 phase, and W2 phase.

The windings for U1 phase and U2 phase are stored in slots 25 adjacent to each other.

The windings for V1 phase and V2 phase are stored in slots 25 adjacent to each other.

The windings for W1 phase and W2 phase are stored in slots 25 adjacent to each other.

Driving is performed such that phases of currents flowing in the two sets of three-phase armature windings are different from each other by 20 degrees to 40 degrees in electric angle.

This configuration provides an effect of reducing torque ripples for electric angle sixth order and twelfth order even though no-load induced voltage has a trapezoidal waveform.

In addition, a pole arc angle of a permanent magnet can be enlarged, and as a result, a fundamental wave of induced voltage can be enlarged, whereby an effect of downsizing the motor can also be obtained.

The waveform of no-load induced voltage can be made trapezoidal by containing harmonics for electric angle third order, fifth order, and seventh order.

In the case of Y connection, a third-order harmonic does not appear in the waveform of line-to-line voltage, but if fifth-order and seventh-order harmonics are contained, a trapezoidal waveform can be made.

In the case where fifth-order and seventh-order harmonics are contained, in a normal three-phase motor, those harmonics cause torque ripple for electric angle sixth order. However, as in the present embodiment 1, if driving is performed such that phases of currents flowing in the two sets of three-phase armature windings are different from each other by 20 degrees to 40 degrees in electric angle, an effect of hardly causing torque ripple for electric angle sixth order is obtained.

That is, the peak value of voltage can be reduced as compared to a sine wave (FIG. 14) of the same fundamental wave.

This means that voltage saturation hardly occurs, and therefore the rotation rate of the motor can be increased, whereby an effect of increasing output of the motor and an effect of reducing torque ripple are obtained.

Since torque ripple for electric angle sixth order can be made very small even though electric angle fifth order and seventh order are contained, a magnetomotive force harmonic on a rotor side may be increased.

Therefore, a pole arc angle of a permanent magnet can be enlarged, whereby an effect of improving usage efficiency of a permanent magnet is obtained.

In addition, as described in another embodiment, it is also possible to use a flat plate-shaped permanent magnet which causes a great magnetomotive force harmonic.

In this case, although no-load induced voltage contains fifth-order and seventh-order harmonics, torque ripple can be reduced.

Further, a flat plate-shaped permanent magnet is easy to process and has high material yield. Therefore, an effect of reducing the cost of a permanent magnet is obtained.

In the above, an example in which the number of the rotor component units is two has been shown. However, the present invention is not limited thereto.

The case of m=3, i.e., the case where the number of the rotor component units is three will be described.

Figure 5:
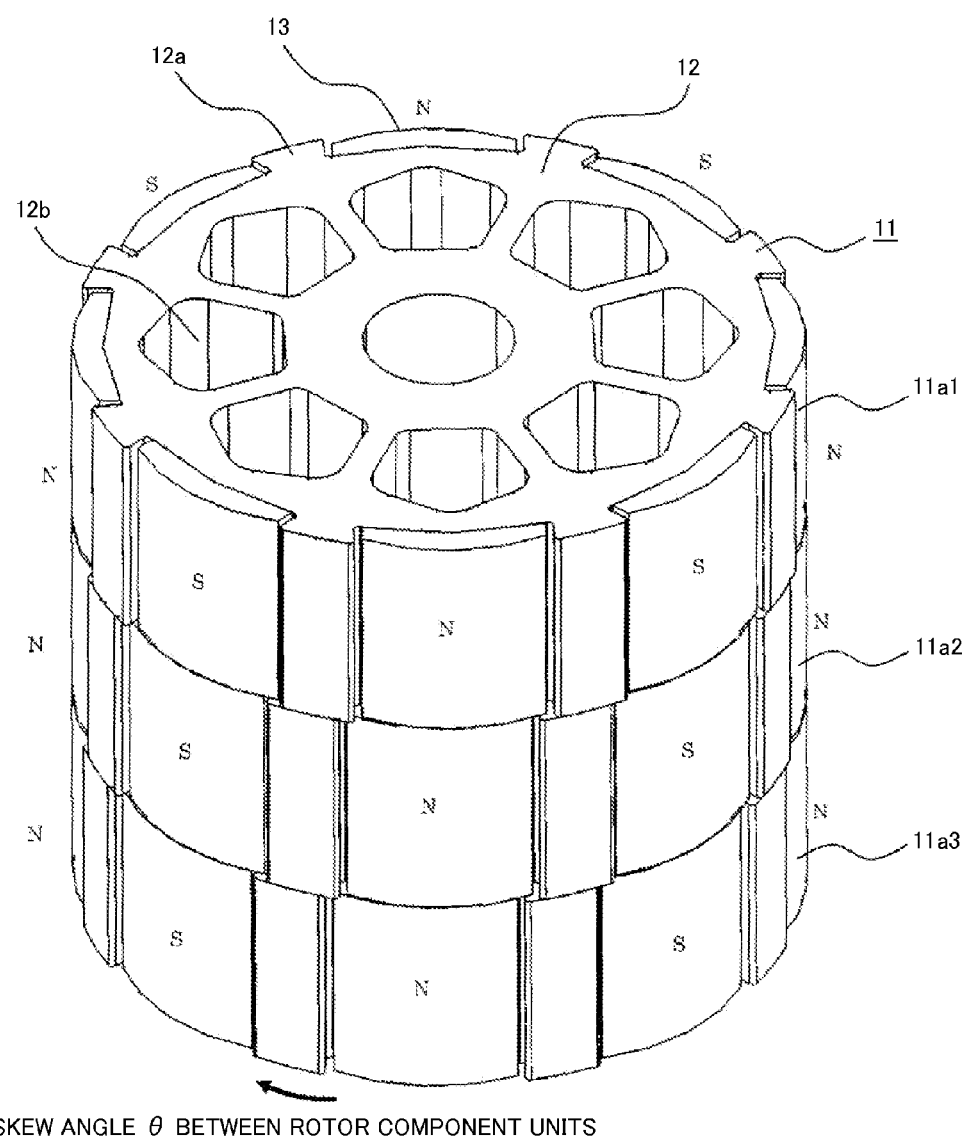
FIG. 5 is a perspective view showing another example of the rotor of the permanent magnet type motor according to embodiment 1.

FIG. 5 is a perspective view of the rotor 11 in the case of m=3.

A rotor component unit 11a1, a rotor component unit 11a2, and a rotor component unit 11a3 are arranged in the axial direction. The rotor component unit 11a1, the rotor component unit 11a2, and the rotor component unit 11a3 are displaced from each other by a skew angle θ in the circumferential direction.

That is, the skew angle between the rotor component unit 11a1 and the rotor component unit 11a2 is θ, and the skew angle between the rotor component unit 11a2 and the rotor component unit 11a3 is also θ.

The rotor component units 11a1, 11a2, and 11a3 have the same axial length.

FIG. 11(b) is a diagram showing three vectors with phase differences by 120 degrees from each other.

A vector v1b, a vector v2b, and a vector v3b have the same magnitude and have phases different from each other by 120 degrees. If these vectors are added, a zero vector is obtained.

The same theory as for the vectors applies to the torque ripple for electric angle twelfth order. That is, phase differences among three twelfth-order components should be set at 360/3=120 degrees. Therefore, θ is to be set at a value obtained by dividing 120 by the order number 12, i.e., 120/12=10 degrees (electric angle).

In order to reduce a p-p value of torque ripple to 4% or lower, the skew angle θ may be set at approximately 10 degrees (electric angle). From the result in FIG. 18, considering that the number of the rotor component units is three, the skew angle θ may be set as follows.

$$26/3 \le \theta \le 43.2/3$$

That is, $$8.67 \le \theta \le 14.4.$$

Figure 16:
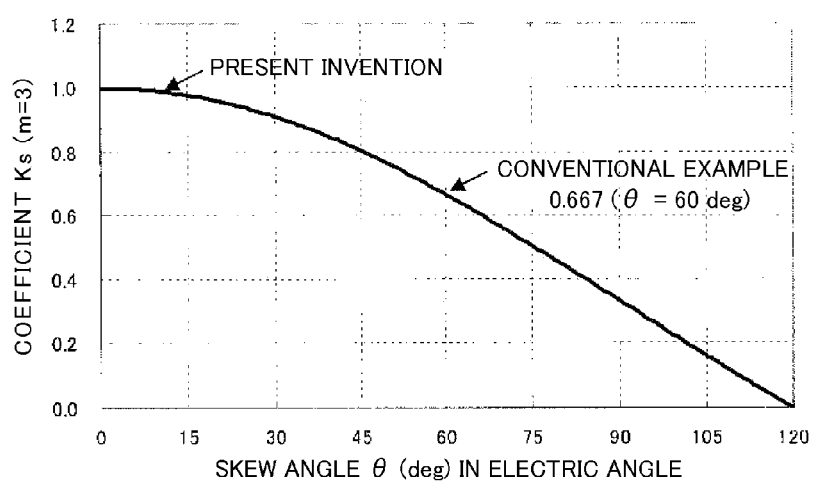
FIG. 16 is a characteristic diagram showing another example of a relationship between a skew angle and a coefficient in the permanent magnet type motor according to embodiment 1.

FIG. 16 shows a coefficient Ks which indicates a degree to which torque in the case of providing three-stage skew is reduced as compared to the case of providing no skew.

In FIG. 16, m=3 on the vertical axis means that the number of the rotor component units is three, that is, three-stage skew is provided.

In the case of m=3, Ks is represented as follows.

$$Ks=(1+2\cos(q))/3 \qquad (2)$$

In a conventional example, the skew angle is 60 degrees in electric angle, and therefore Ks is 0.667 as indicated by an arrow in the graph. On the other hand, in the case where θ is set at 8.67 degrees to 14.4 degrees (electric angle), from expression (2), Ks becomes 0.992 to 0.979.

Thus, it is found from FIG. 16 and expression (2) that torque is greatly improved.

Next, the case of m=4, i.e., the case where the number of the rotor component units is four will be described.

Figure 6:
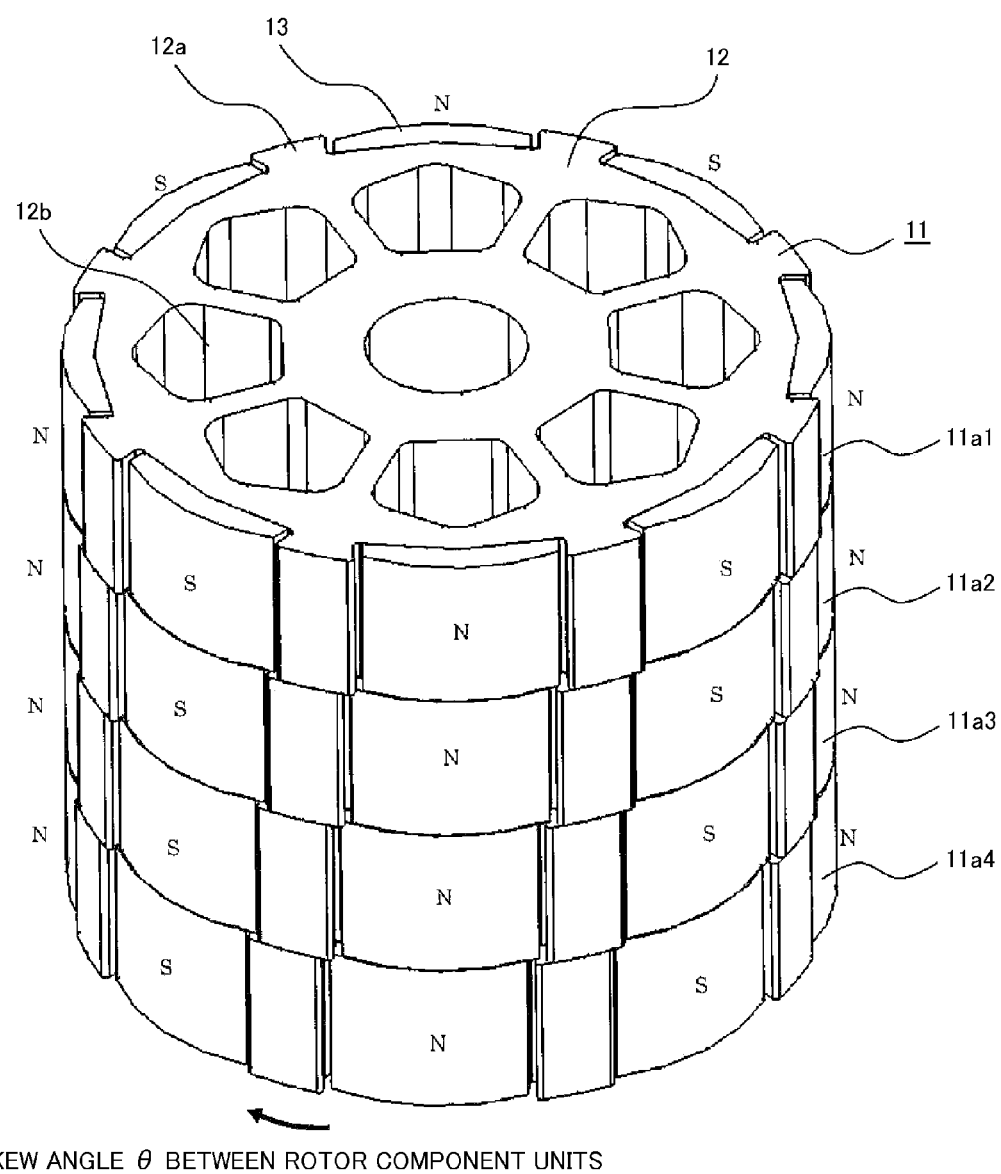
FIG. 6 is a perspective view showingstill another example of the rotor of the permanent magnet type motor according to embodiment 1.

FIG. 6 is a perspective view of the rotor 11 in the case of m=4.

A rotor component unit 11a1, a rotor component unit 11a2, a rotor component unit 11a3, and a rotor component unit 11a4 are arranged in the axial direction.

The rotor component unit 11a1, the rotor component unit 11a2, the rotor component unit 11a3, and the rotor component unit 11a4 are displaced from each other by a skew angle θ in the circumferential direction.

That is, the skew angle between the rotor component unit 11a1 and the rotor component unit 11a2 is θ, the skew angle between the rotor component unit 11a2 and the rotor component unit 11a3 is also θ, and the skew angle between the rotor component unit 11a3 and the rotor component unit 11a4 is also θ.

The rotor component units 11a1, 11a2, 11a3, and 11a4 have the same axial length.

FIG. 11(c) is a diagram showing four vectors with phase differences by 90 degrees from each other.

A vector v1c, a vector v2c, a vector v3c, and a vector v4c have the same magnitude and have phases different from each other by 90 degrees. If these vectors are added, a zero vector is obtained.

The same theory as for the vectors applies to the torque ripple for electric angle twelfth order. That is, phase differences among four twelfth-order components should be set at 360/4=90 degrees. Therefore, θ is to be set at a value obtained by dividing 90 by the order number 12, i.e., 90/12=7.5 degrees (electric angle).

In order to reduce a p-p value of torque ripple to 4% or lower, the skew angle θ may be set at approximately 7.5 degrees (electric angle). From the result in FIG. 18, considering that the number of the rotor component units is four, the skew angle θ may be set as follows.

$$26/4 \le \theta \le 43.2/4$$

That is, $$6.5 \le \theta \le 10.8.$$

Figure 17:
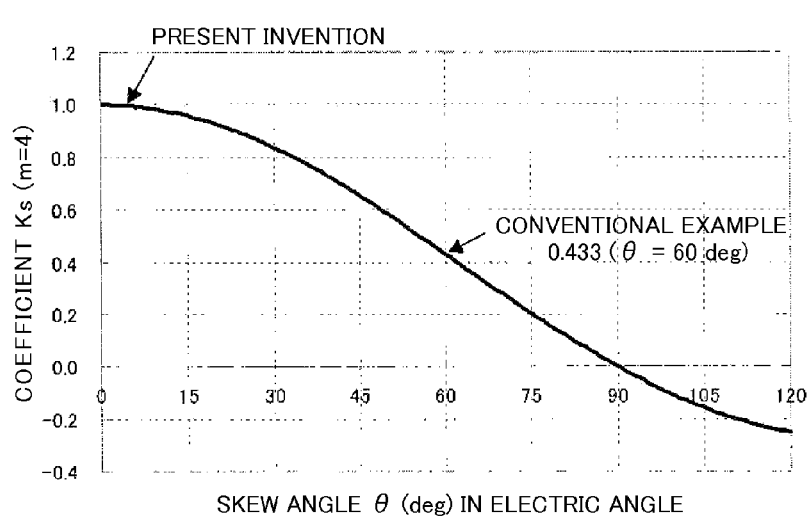
FIG. 17 is a characteristic diagram showing still another example of a relationship between a skew angle and a coefficient in the permanent magnet type motor according to embodiment 1.

FIG. 17 shows a coefficient Ks which indicates a degree to which torque in the case of providing four-stage skew is reduced as compared to the case of providing no skew.

In FIG. 17, m=4 on the vertical axis means that the number of the rotor component units is four, that is, four-stage skew is provided.

In the case of m=4, Ks is represented as follows.

$$Ks=\{\cos(3q/2))+\cos(q/2)\}/2 \qquad (3)$$

In a conventional example, the skew angle is 60 degrees in electric angle, and therefore Ks is 0.433 as indicated by an arrow in the graph. On the other hand, in the case where θ is set at 6.7 degrees to 10.8 degrees (electric angle), from expression (3), Ks becomes 0.991 to 0.978.

Thus, it is found from FIG. 17 and expression (3) that torque is greatly improved.

In general, in the case where the number of rotor component units is m, similarly, the skew angle θ (electric angle) may be set as follows.

$$26/m \le \theta \le 43.2/m$$

In FIG. 4, FIG. 5, and FIG. 6, the rotor component units have the same axial length.

The reason is to make the rotor component units equally share torque and torque ripple, thereby further effectively exerting an effect of reducing torque ripple by the skew structure.

In addition, since the same rotor component units are used, an effect that common parts can be used is obtained.

As described above, the permanent magnet type motor according to embodiment 1 of the present invention includes: the rotor 11 including the rotor iron core 12 and the plurality of permanent magnets 13 provided in the rotor iron core 12 and forming magnetic poles; and the stator 21 including the stator iron core 22 and the armature windings 26 composed of two sets of three-phase windings, which are first and second armature windings, stored in the plurality of slots 25 formed in the stator iron core 22. The armature windings 26 are composed of the two sets of three-phase armature windings 26-1 and 26-2. The first armature windings 26-1 are supplied with current from the first inverter 102-1, and the second armature windings 26-2 are supplied with current from the second inverter 102-2. Of the two sets of three-phase armature windings 26-1 and 26-2, the first armature windings 26-1 are composed of windings for U1 phase, V1 phase, and W1 phase, and the second armature windings 26-2 are composed of windings for U2 phase, V2 phase, and W2 phase. The windings for U1 phase and U2 phase are stored in the slots 25 adjacent to each other, the windings for V1 phase and V2 phase are stored in the slots 25 adjacent to each other, and the windings for W1 phase and W2 phase are stored in the slots 25 adjacent to each other. Driving is performed such that phases of currents flowing in the two sets of three-phase armature windings 26-1 and 26-2 are different from each other by 20 degrees to 40 degrees in electric angle. The rotor 11 is composed of m stages of rotor component units arranged in the axial direction. The m stages of rotor component units are skewed to have a stage-skew structure. The skew angle θ (unit: degree)

between the adjacent units satisfies 26/m≤θ≤43.2/m (m is an integer equal to or greater than 2) in electric angle. Therefore, an effect of realizing torque improvement, size reduction and output increase in the motor, and reduction in torque ripples for electric angle sixth order and twelfth order at the same time, is obtained.

In the present embodiment, a motor in which permanent magnets 13 adjacent to each other in the circumferential direction have different polarities has been shown. However, needless to say, the same effect is obtained even in the case of a consequent-pole-type motor which is configured by only N pole or only S pole.

Embodiment 2

In embodiment 1, the permanent magnets 13 are placed on the surface of the rotor iron core 12, but the present invention is not limited thereto. An interior permanent magnet type may be employed.

Figure 7:
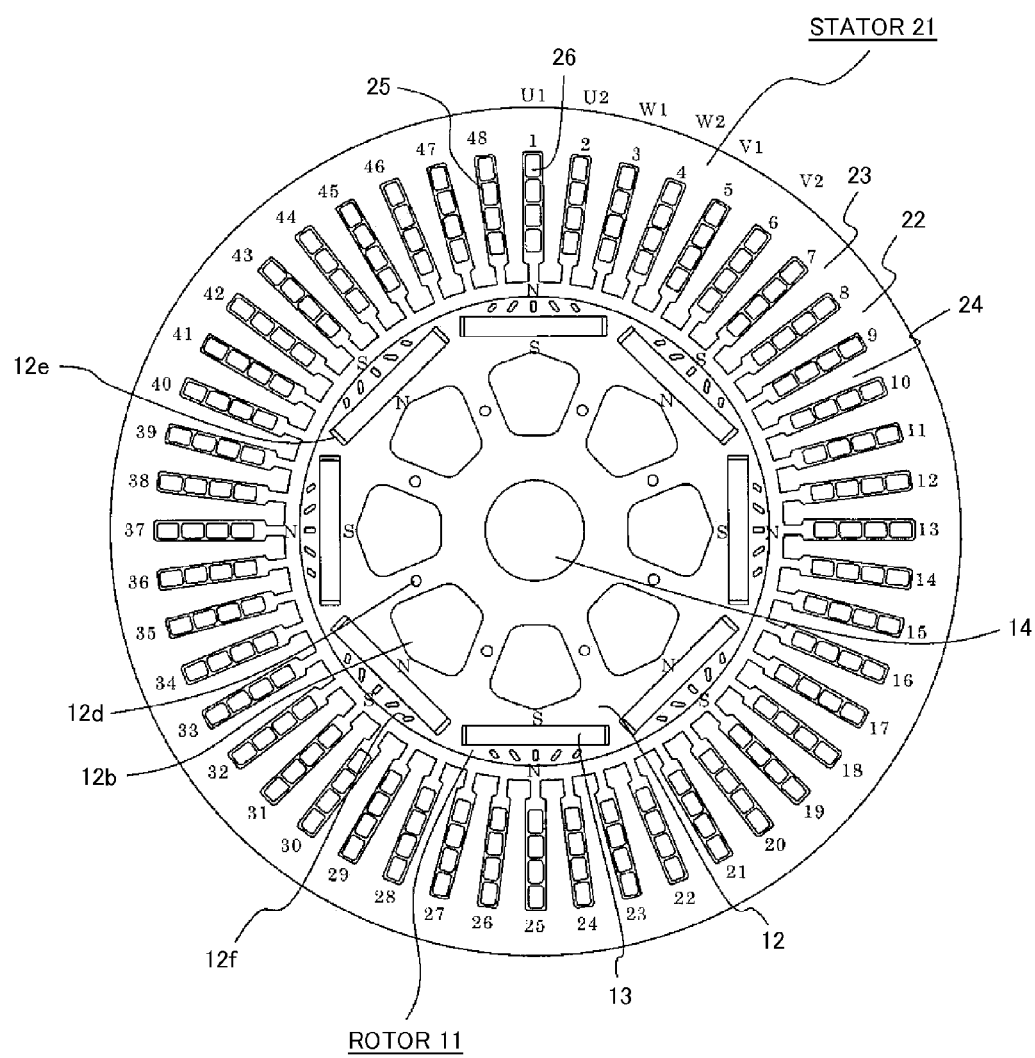
FIG. 7 is a sectional view showing a permanent magnet type motor according to embodiment 2 of the present invention.

FIG. 7 is a sectional view showing a permanent magnet type motor according to embodiment 2 of the present invention.

The stator 21 has the same structure as in FIG. 3.

The rotor 11 is different from that in FIG. 3. Flat plate-shaped permanent magnets 13 are embedded in permanent magnet holes 12e of the rotor iron core 12.

The permanent magnets 13 adjacent to each other in the circumferential direction have different polarities.

The rotor iron core 12 has slits 12f located nearer the stator 21 than the permanent magnets 13 are.

In FIG. 7, five slits 12f are formed at each magnetic pole.

Each slit 12f is filled with a nonmagnetic material such as air or resin.

The slits 12f are formed obliquely so that a magnetic flux passes toward the center of a magnetic pole.

Thus, torque of the motor increases, whereby a motor with small size and high output can be obtained.

The rotor iron core 12 has holes 12b. Owing to the holes 12b, weight and inertia can be reduced.

The rotor iron core 12 is formed by stacking electromagnetic steel sheets or the like, and the electromagnetic steel sheets are joined with each other via swage portions 12d.

The shaft 14 penetrates through the center of the rotor iron core 12.

Figure 8:
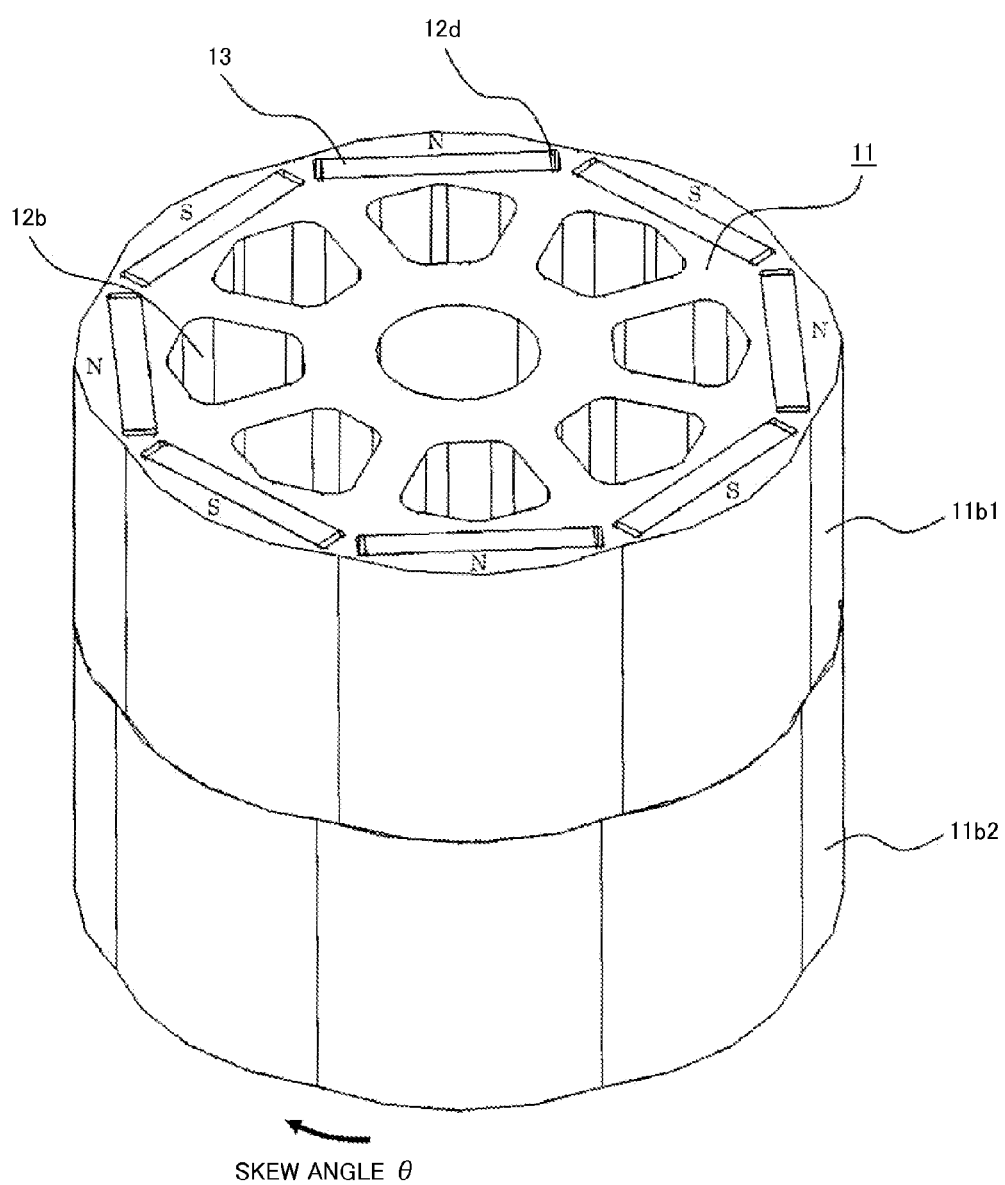
FIG. 8 is a perspective view showing a rotor of the permanent magnet type motor according to embodiment 2.

FIG. 8 is a perspective view showing the rotor of the permanent magnet type motor according to embodiment 2.

A rotor component unit 11b1 and a rotor component unit 11b2 are arranged in the axial direction.

The rotor component unit 11b1 and the rotor component unit 11b2 have the same axial length.

The rotor component unit 11b1 and the rotor component unit 11b2 are skewed from each other with an angle θ (electric angle).

As described in embodiment 1, if the skew angle θ is set in a range from 13 degrees to 21.6 degrees (electric angle), torque ripple can be reduced to 4% or lower.

In the case where the rotor 11 is composed of m stages of rotor component units arranged in the axial direction, the same theory as in embodiment 1 applies.

If the m stages of rotor component units are skewed to have a stage-skew structure such that the skew angle θ (unit: degree) between the adjacent units satisfies 26/m≤θ≤43.2/m (m is an integer equal to or greater than 2) in electric angle, an effect of realizing torque improvement, size reduction and output increase in the motor, and reduction in torque ripples for electric angle sixth order and twelfth order at the same time, is obtained.

In the present embodiment 2, a motor in which permanent magnets 13 adjacent to each other in the circumferential direction have different polarities has been shown. However, needless to say, the same effect is obtained even in the case of a consequent-pole-type motor which is configured by only N pole or only S pole.

In FIG. 7 and FIG. 8, the permanent magnet 13 has a flat plate shape.

As compared to a curved-surface magnet, processing cost for the flat plate-shaped permanent magnet 13 is smaller and the yield thereof is higher, and therefore the cost is reduced. Meanwhile, a magnetomotive force harmonic of the rotor tends to increase, and harmonics for fifth order, seventh order, and the like are contained in no-load induced voltage of the motor, so that the no-load induced voltage is likely to have a trapezoidal waveform.

In the case where distributed winding from the first slot 25 to the seventh slot 25 is formed as shown in FIG. 7 (the stator 21 has the same configuration as in FIG. 1), full-pitch winding is formed and therefore the short-pitch factor is 1. In addition, in the configuration in FIG. 7, the distribution factor is also 1. Therefore, the no-load induced voltage is likely to contain harmonics.

In the case of sine-wave-driving the motor 10 whose no-load induced voltage has a trapezoidal waveform, in a conventional three-phase motor structure, torque ripple greatly increases, thereby causing a problem of vibration and noise. However, the configuration of the present embodiment 2 provides an effect of reducing torque ripples for electric angle sixth order and twelfth order even though no-load induced voltage has a trapezoidal waveform.

In addition, a pole arc angle of the permanent magnet 13 can be enlarged, and as a result, a fundamental wave of induced voltage can be enlarged, whereby an effect of downsizing the motor can also be obtained.

Since flat plate-shaped permanent magnets can be used, an effect that a motor can be obtained with low cost is also obtained.

In the case of interior permanent magnet type, a protection pipe for preventing permanent magnets from flying off is not needed, and therefore an effect of reducing the cost is obtained.

Embodiment 3

Figure 9:
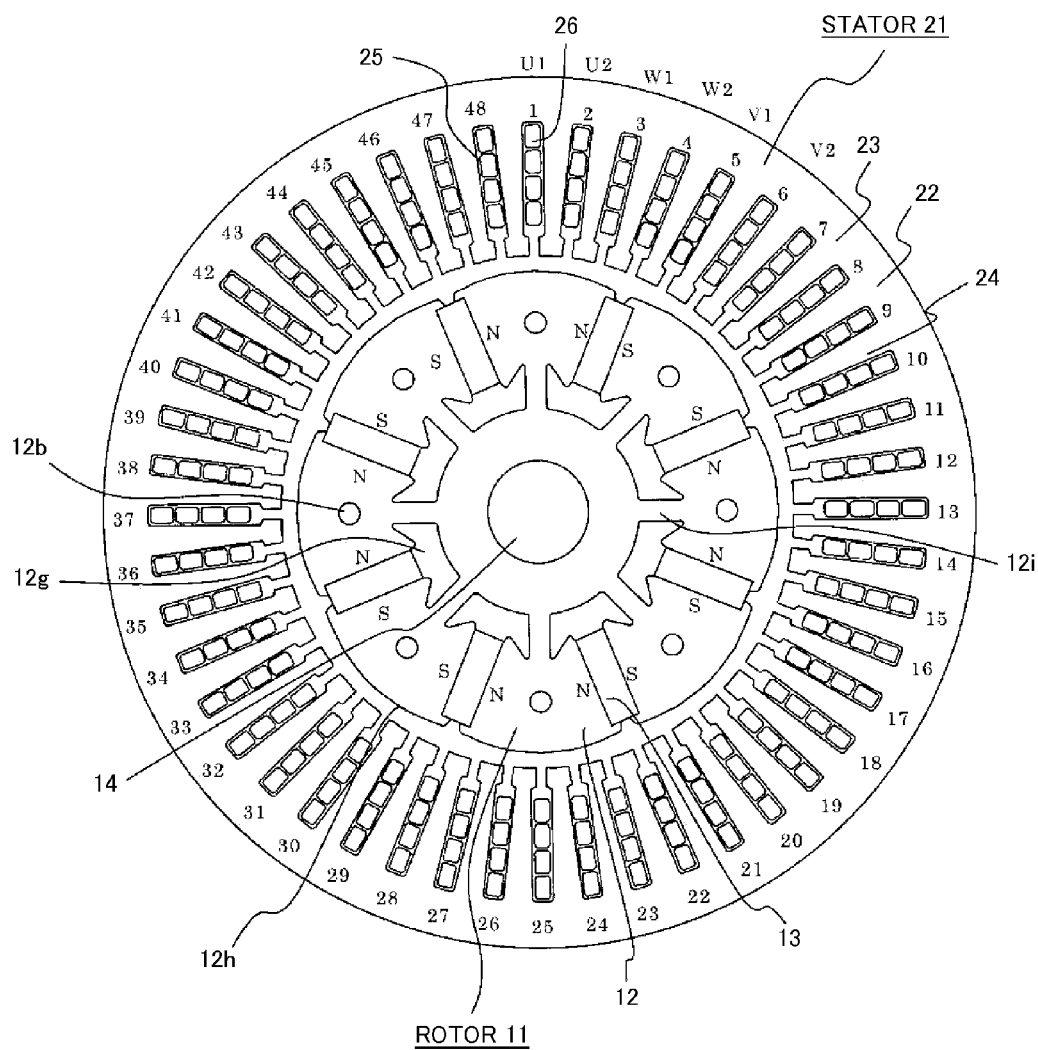
FIG. 9 is a perspective view showing a permanent magnet type motor according to embodiment 3.

FIG. 9 is a perspective view showing a permanent magnet type motor according to embodiment 3.

The stator 21 has the same structure as in FIG. 3.

The rotor 11 has a different structure from those in FIG. 3 and FIG. 7.

The rotor 11 has the shaft 14 as a rotation shaft and the rotor iron core 12 outside the shaft 14.

Each permanent magnet 13 has such a shape that a radial length is longer than a circumferential length. Eight such permanent magnets 13 are arranged at regular intervals along the circumferential direction.

The permanent magnets 13 are magnetized to have N pole and S pole as indicated by N and S in FIG. 9.

That is, the permanent magnets 13 are magnetized such that surfaces facing each other of the adjacent permanent magnets 13 have the same polarity. Such magnetization causes a magnetic flux to concentrate on the rotor iron core 12, thereby providing an effect of increasing a magnetic flux density.

The rotor iron core 12 is interposed between the adjacent permanent magnets 13.

A surface, of the rotor iron core 12, that faces the stator 21, has a curved-surface portion 12h which has such a convex curved surface that the length of a gap from the stator 21 becomes short at the middle between the adjacent permanent magnets.

Owing to such a shape, the waveform of a magnetic flux density in the gap can be smoothened, whereby cogging torque and torque ripple can be reduced.

A nonmagnetic portion 12g is formed in contact with an end surface on a radially inner side of each permanent magnet 13.

This portion may be air or may be filled with resin, or a nonmagnetic metal such as stainless or aluminum may be inserted therein.

Thus, a leaked magnetic flux of the permanent magnet 13 can be reduced.

A connection portion 12i is formed between the rotor iron core 12 present between the adjacent permanent magnets 13, and the rotor iron core 12 surrounding the outer circumference of the shaft 14.

This portion serves as a role to mechanically connect those rotor iron core portions.

A hole 12b is formed between the adjacent permanent magnets 13.

Since the hole 12b is hollow, an effect of reducing weight and inertia of the rotor can be obtained.

Figure 10:
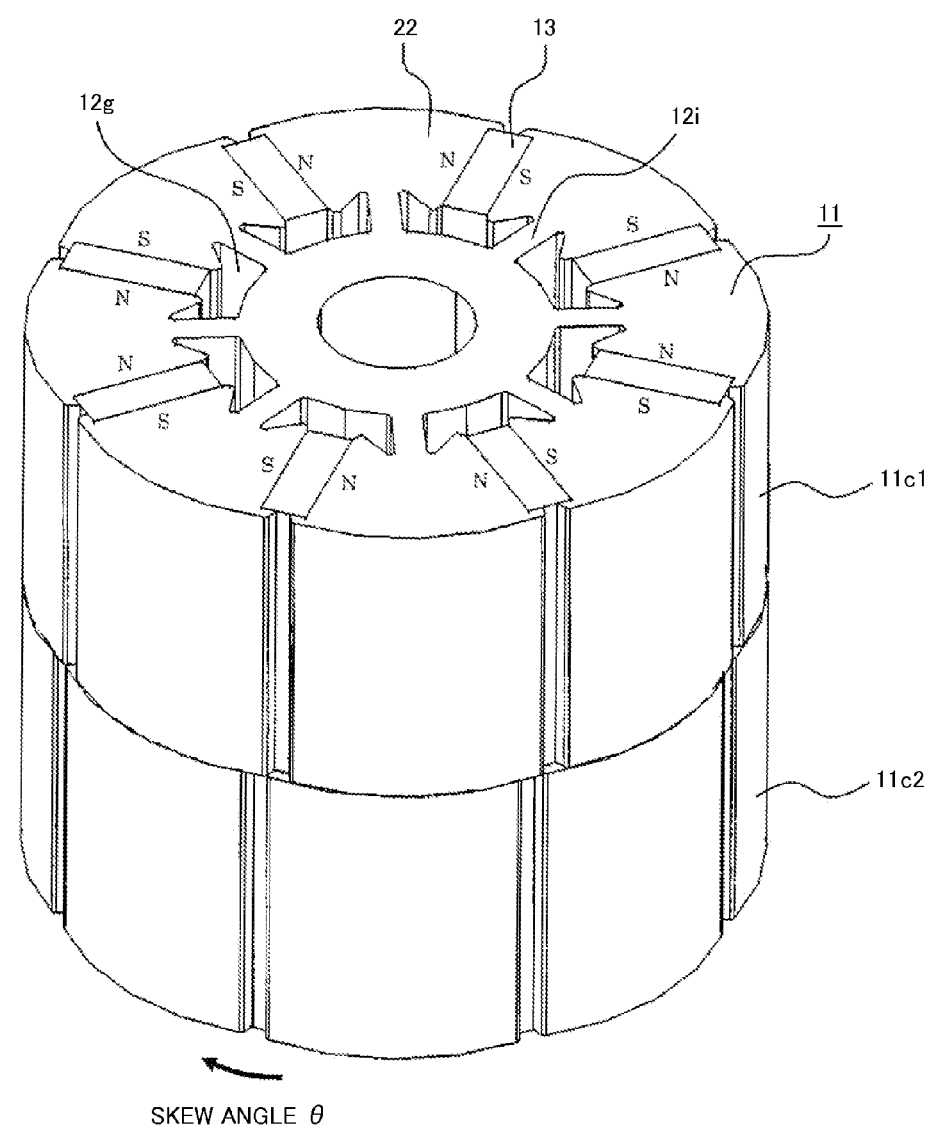
FIG. 10 is a perspective view showing a rotor of the permanent magnet type motor according to embodiment 3.

FIG. 10 is a perspective view showing the rotor of the permanent magnet type motor according to embodiment 3.

A rotor component unit 11c1 and a rotor component unit 11c2 are arranged in the axial direction.

The rotor component unit 11c1 and the rotor component unit 11c2 has the same axial length.

The rotor component unit 11c1 and the rotor component unit 11c2 are skewed from each other with an angle θ (electric angle).

As described in embodiment 1, if the skew angle θ is set in a range from 13 degrees to 21.6 degrees (electric angle), torque ripple can be reduced to 4% or lower.

In the case where the rotor 11 is composed of m stages of rotor component units arranged in the axial direction, the same theory as in embodiment 1 applies.

If the m stages of rotor component units are skewed to have a stage-skew structure such that the skew angle θ (unit: degree) between the adjacent units satisfies $26/m \leq \theta \leq 43.2/m$ (m is an integer equal to or greater than 2) in electric angle, an effect of realizing torque improvement, size reduction and output increase in the motor, and reduction in torque ripples for electric angle sixth order and twelfth order at the same time, is obtained.

In the present embodiment, a motor in which permanent magnets adjacent to each other in the circumferential direction have different polarities has been shown. However, needless to say, the same effect is obtained even in the case of a consequent-pole-type motor which is configured by only N pole or only S pole.

In FIG. 9 and FIG. 10, the permanent magnet 13 has a flat plate shape.

As compared to a curved-surface magnet, processing cost for the flat plate-shaped permanent magnet 13 is smaller and the yield thereof is higher, and therefore the cost is reduced. Meanwhile, a magnetomotive force harmonic of the rotor tends to increase, and harmonics are contained in no-load induced voltage of the motor, so that the no-load induced voltage is likely to have a trapezoidal waveform.

In the case where distributed winding from the first slot 25 over to the seventh slot 25 is formed as shown in FIG. 9 (the stator 21 has the same configuration as in FIG. 3), the short-pitch factor is 1, and the distribution factor is also 1. Therefore, the no-load induced voltage is likely to contain harmonics at fifth order, seventh order, and the like.

In the case of sine-wave-driving the motor whose no-load induced voltage has a trapezoidal waveform, in a conventional three-phase motor structure, torque ripple greatly increases, thereby causing a problem of increasing vibration and noise. However, the configuration of the present embodiment 3 provides an effect of reducing torque ripples for electric angle sixth order and twelfth order even though no-load induced voltage has a trapezoidal waveform.

In addition, a pole arc angle of the permanent magnet can be enlarged, and as a result, a fundamental wave of induced voltage can be enlarged, whereby an effect of downsizing the motor can also be obtained.

Since flat plate-shaped permanent magnets can be used, an effect that a motor can be obtained with low cost is also obtained.

Embodiment 4

Figure 20:
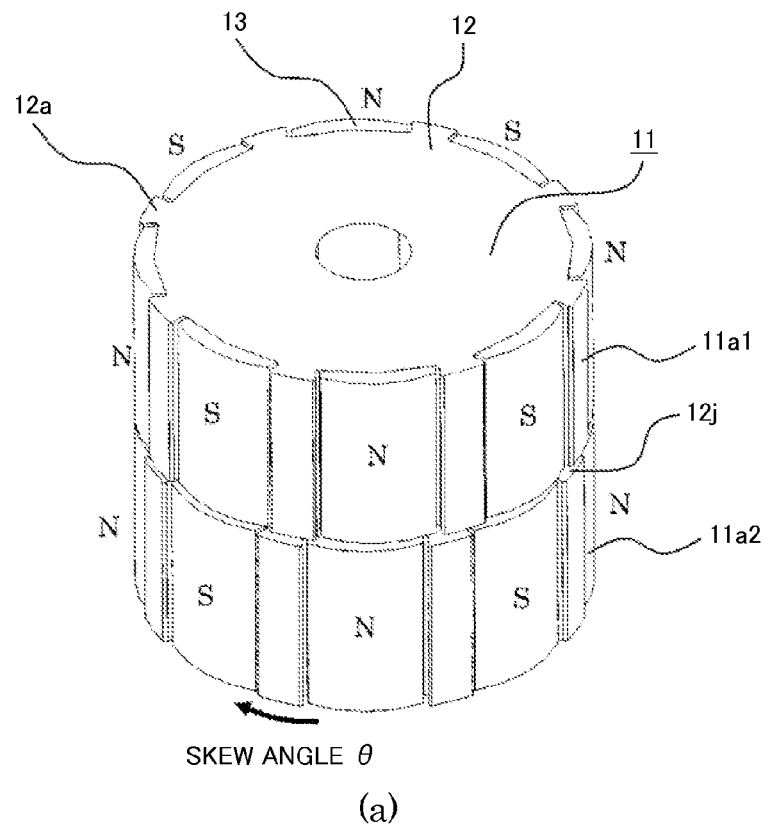
FIGS. 20(*a*) and 20(*b*) FIGS. 20(*a*) and 20(*b*)are a perspective view and a side view showing a rotor of a permanent magnet type motor according to embodiment 4 of the present invention.
Figure 20:
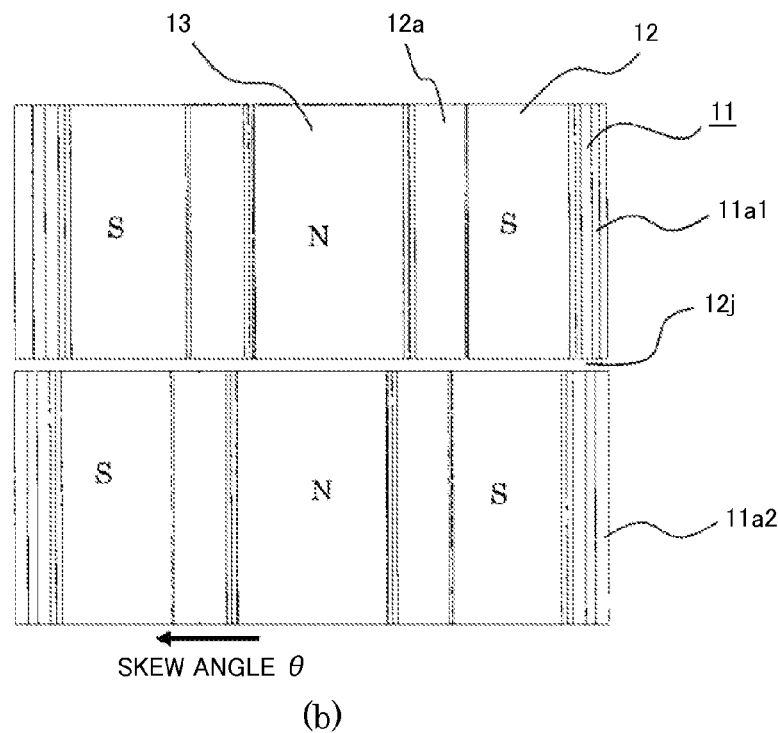

FIG. 20 shows a rotor of a permanent magnet type motor according to embodiment 4 of the present invention. FIG. 20(a) is a perspective view thereof and FIG. 20(b) is a side view thereof.

Rotor component units 11a1 and 11a2 arranged in the axial direction are skewed from each other, and a nonmagnetic portion 12j is formed between the rotor component unit 11a1 and the rotor component unit 11a2.

In FIG. 20, a gap is formed therebetween, that is, air is present as the nonmagnetic portion 12j. However, a part formed by a nonmagnetic metal such as resin, aluminum, or SUS may be provided.

Owing to such a structure, a magnetic flux hardly passes in the axial direction between the rotor component units arranged in the axial direction. Therefore, a leaked magnetic flux can be reduced and torque is improved. That is, an effect of downsizing the motor is obtained.

Although FIG. 20 shows the case of m=2, i.e., the case where the number of the rotor component units is two, the number is not limited thereto.

Even in the case where the number m of the rotor component units is three or more, needless to say, an effect of reducing a leaked magnetic flux and improving torque is obtained by placing the nonmagnetic portion 12j at least one location between the rotor component units arranged in the axial direction.

Embodiment 5

By applying the motors described in embodiments 1 to 4 to an EPS, an effect of realizing increase in torque and reduction in vibration and noise at the same time is obtained in addition to the effects described in the above embodiments.

The electric power steering device in which the motor 10 is placed in parallel with the movement direction (indicated by an arrow) of the rack shaft as shown in FIG. 21 is a system suitable for a large vehicle. On the other hand, it is required to increase output of the motor 10, and there is a problem that vibration and noise due to the motor 10 increase along with the output increase.

However, by applying the motors described in embodiments 1 to 4, an effect of solving the above problem, allowing an electric power steering device to be applied also to a large vehicle, and reducing fuel cost, is obtained.

In an EPS, a motor is required to be downsized.

Particularly, in a system in which the motor 10 and the ECU are placed in parallel with the movement direction (indicated by an arrow) of the rack shaft as shown in FIG. 21, it is important to reduce an outer diameter of the motor 10 rather than reducing the axial length thereof, because of layout restriction.

In order to reduce an outer diameter of the motor 10, it is necessary to reduce a core back thickness (see FIG. 3) of the stator iron core.

However, it is necessary to hold a core back portion in a process for fixing the stator 21 to the frame 27, and the core back 23 of the stator iron core needs to have a predetermined thickness in order to secure an area for the holding.

On the other hand, if the core back thickness is excessively large, it is inevitable that a space for the armature winding 26 is reduced or an outer diameter of the rotor 11 is reduced, resulting in increase in heat generation in the motor or reduction in output.

An outer diameter of the stator iron core 22 of the motor for EPS is about 80 to 90 mm.

For the above reason, it is desirable to set the core back thickness to be not smaller than 4 mm and not greater than 7 mm.

However, if the core back 23 is thinned and a magnetic flux density at a core back portion excessively increases, torque reduction or torque ripple increase is caused due to magnetic saturation.

This tendency is remarkable particularly in the case of using a neodymium-iron-boron-based rare-earth magnet having a residual magnetic flux density of 1.0 T or greater as the permanent magnet 13 of the rotor 11.

Accordingly, in order to increase the number M of poles of the motor so that the magnetic flux density in the core back 23 reduces, it is desirable that the number of poles is six or more, i.e., 6≤M.

However, considering the frequency at high-speed rotation, the number of poles cannot be much increased. In the case of motor for EPS, it is desirable that the number of poles is fourteen or less.

Therefore, the following range is desirable.

6≤M≤14

On the other hand, if the number N of slots satisfies N=6M as in the case where the number of slots is forty-eight and the number of poles is eight as shown in FIGS. 3, 7, and 9, since the number of slots becomes an integer, arrangement of the first armature windings and the second armature windings is simplified, whereby an effect of facilitating manufacturing of the armature windings is obtained, and also, the effects described in embodiments 1 to 4 are obtained.

Under the condition of 6≤M≤14 and the condition that the core back thickness is not smaller than 4 mm and not greater than 7 mm, the magnetic flux density at the core back portion is not sufficiently reduced.

For example, in the case where the magnetic flux density is 1.5 T or greater, an influence of magnetic saturation appears, so that torque ripple is influenced.

FIG. 18 is a characteristic diagram in the case where the magnetic flux density in the core back 23 is 1.5 T or greater, under rated current.

A skew angle at which torque ripple is minimized is greater than 15 degrees in electric angle.

It is found that this angle is different from the skew angle (see FIG. 19) at which cogging torque is minimized. Therefore, it is necessary to set the skew angle to be greater than 15 degrees in electric angle.

From the above result, in the case of two-stage skew (m=2), the skew angle may be increased in a range of 15≤θ≤21.6.

To generalize this, in the case of having m-number of rotor component units, 30/m≤θ≤43.2/m (m is an integer equal to or greater than 2) may be satisfied.

From the above, even in the case where the magnetic flux density in the core back 23 is 1.5 T or greater under rated current, reduction in torque ripple and reduction in cogging torque can be realized at the same time.

It is noted that, within the scope of the present invention, the above embodiments may be freely combined with each other, or each of the above embodiments may be modified or abbreviated as appropriate.

DESCRIPTION OF THE REFERENCE CHARACTERS

10: motor, 11: rotor, 11a1 to 11a4: rotor component unit, 11b1, 11b2: rotor component unit, 11c1, 11c2: rotor component unit, 12: rotor iron core, 12a: protrusion, 12b: hole, 12c: gap, 12d: swage portion, 12e: permanent magnet hole, 12f: slit, 12g: nonmagnetic portion, 12h: curved-surface portion, 12i: connection portion, 12j: nonmagnetic portion, 13: permanent magnet, 14: shaft, 21: stator, 22: stator iron core, 23: core back, 24: tooth, 25: slot, 26: armature winding, 26-1: first armature winding, 26-2: second armature winding, 27: frame, 28: housing, 29: bolt, 30: bearing, 31: bearing, 32: wall portion, 33: pulley, 34: sensor permanent magnet, 101: ECU, 102: inverter, 102-1: first inverter, 102-2: second inverter, 103: power supply, 104: coil, 105: power supply relay, 105-1: first power supply relay, 105-2: second power supply relay, 106-1: capacitor, 106-2: capacitor, 107-1 to 107-6: MOS-FET, 108-1 to 108-6: MOS-FET, 109-1 to 109-3: shunt, 110-1 to 110-3: shunt, 111: rotation angle sensor, 121: intermediate member, 122: control board, 123: case, 124: heat sink, 124a: dent, 125: sensor portion, 126: magnetic sensor, 127: board, 128: connection member, 129: support portion, 201: shaft, 202: torque sensor, 203: connector, 204: connector, 205: power supply connector, 206: gearbox, 207: housing, 208: tie rod, 209: rack boot

The invention claimed is:

1. A permanent magnet type motor for electric power steering, comprising:
a rotor including a rotor iron core, and permanent magnets placed in the rotor iron core and forming magnetic poles; and
a stator including a stator iron core and armature windings stored in a plurality of slots formed in the stator iron core, the armature windings being composed of two sets of three-phase windings which are first and second armature windings, wherein
the first armature windings are supplied with current from a first inverter,
the second armature windings are supplied with current from a second inverter,
of the two sets of three-phase windings, the first armature windings are composed of windings for U1 phase, V1 phase, and W1 phase, and the second armature windings are composed of windings for U2 phase, V2 phase, and W2 phase,
the windings for U1 phase and U2 phase are stored in slots adjacent to each other,
the windings for V1 phase and V2 phase are stored in slots adjacent to each other,
the windings for W1 phase and W2 phase are stored in slots adjacent to each other,
driving is performed such that phases of currents flowing in the two sets of three-phase windings are different from each other by 20 degrees to 40 degrees in electric angle,
the rotor is composed of m stages of rotor component units arranged in an axial direction, the m stages of rotor component units each include rare-earth permanent magnets as the permanent magnets, the m stages of rotor component units are skewed to have a stage-skew structure such that a skew angle θ(unit: degree) between the adjacent units satisfies $32.4/m \leq \theta \leq 36/m$ (m is an integer equal to or greater than 2) in electric angle, a number N of slots in the stator iron core and a number M of poles in the rotor satisfy N=6M and $6 \leq M \leq 14$ (N and M are integers), an outer diameter of the stator iron core is 80 to 90 mm, and a thickness of a core back of the stator iron core is not less than 4 mm and not greater than 7 mm, a neodymium-iron-boron-based rare-earth magnet having a residual magnetic flux density of 1.0 T or greater is used for each of the permanent magnets, and the permanent magnet type motor is placed in parallel with a movement direction of a rack shaft of an electric power steering device, and generates assist torque.

2. The permanent magnet type motor for electric power steering according to claim 1, wherein the phases of currents flowing in the two sets of three-phase windings are different from each other by 30 degrees in electric angle.

3. The permanent magnet type motor for electric power steering according to claim 1, wherein the windings for U1 phase, V1 phase, and W1 phase of the first armature windings and the windings for U2 phase, V2 phase, and W2 phase of the second armature windings are all formed by full-pitch winding.

4. The permanent magnet type motor for electric power steering according to claim 1, wherein a line-to-line voltage waveform of no-load induced voltage in the armature windings is a trapezoidal waveform.

5. The permanent magnet type motor for electric power steering according to claim 1, wherein a line-to-line voltage waveform of no-load induced voltage in the armature windings contains harmonics for electric angle fifth order and seventh order.

6. The permanent magnet type motor for electric power steering according to claim 1, wherein the rotor iron core has protrusions, and has gaps between the protrusions and the permanent magnets.

7. The permanent magnet type motor for electric power steering according to claim 1, wherein the permanent magnets are placed in holes formed in the rotor iron core.

8. The permanent magnet type motor for electric power steering according to claim 1, wherein each permanent magnet has such a shape that a radial length is longer than a circumferential length, the permanent magnets are magnetized such that surfaces facing each other of the adjacent permanent magnets have the same polarity, the rotor iron core is interposed between the adjacent permanent magnets, and a surface, of the interposed rotor iron core, that faces the stator has a curved-surface portion which has such a convex curved surface that a length of a gap from the stator becomes short at a middle between the adjacent permanent magnets, and a nonmagnetic portion is placed in contact with an end surface on a radially inner side of each permanent magnet.

9. The permanent magnet type motor for electric power steering according to claim 8, wherein each permanent magnet has a flat plate shape.

10. The permanent magnet type motor for electric power steering according to claim 1, wherein a hole is formed on an inner side with respect to each permanent magnet in the rotor iron core.

11. The permanent magnet type motor for electric power steering according to claim 1, wherein the rotor component units have the same length in a rotation-axis direction.

12. The permanent magnet type motor for electric power steering according to claim 1, wherein a nonmagnetic portion is placed at least one location between the plurality of rotor component units arranged in the axial direction.

* * * * *